(12) United States Patent
Gay

(10) Patent No.: US 6,647,145 B1
(45) Date of Patent: Nov. 11, 2003

(54) MEANS FOR INPUTTING CHARACTERS OR COMMANDS INTO A COMPUTER

(75) Inventor: Geoffrey Norman Walter Gay, Skelmersdale (GB)

(73) Assignee: Co-Operwrite Limited, Manchester (GB)

(*) Notice: Subject to any disclaimer, the term of this patent is extended or adjusted under 35 U.S.C. 154(b) by 0 days.

(21) Appl. No.: 09/355,217

(22) PCT Filed: Jan. 27, 1998

(86) PCT No.: PCT/GB98/00245

§ 371 (c)(1),
(2), (4) Date: Jul. 23, 1999

(87) PCT Pub. No.: WO98/33141

PCT Pub. Date: Jul. 30, 1998

(30) Foreign Application Priority Data

Jan. 29, 1997 (GB) .......................................... 97017933

(51) Int. Cl.$^7$ ................................................ G06K 9/00
(52) U.S. Cl. ...................... 382/187; 382/188; 382/189; 382/202; 382/313; 382/314; 178/18.01; 178/18.03; 345/173; 345/179; 345/702
(58) Field of Search ................................ 382/181, 185, 382/186, 187, 188, 189, 197, 202, 209, 229, 291, 292, 309, 310, 313, 314; 178/18.01–18.03, 19.04; 235/472.01; 345/163, 169, 173, 179, 183, 702; 358/473

(56) References Cited

U.S. PATENT DOCUMENTS

| 4,423,286 A | 12/1983 | Bergeron | 178/18.07 |
| 4,532,376 A | 7/1985 | Rockwell | 178/19.01 |
| 4,641,354 A | 2/1987 | Fukunaga et al. | 382/189 |

(List continued on next page.)

FOREIGN PATENT DOCUMENTS

| EP | 0 254 561 | 1/1988 |
| EP | 0 509 224 | 10/1992 |
| GB | 1 463 888 | 2/1977 |
| GB | 1 494 901 | 12/1977 |
| GB | 2 092 352 | 8/1982 |
| GB | 2 162 982 A | 7/1985 |
| GB | 2 193 827 A | 7/1987 |
| WO | WO 86/04704 | 8/1986 |
| WO | WO 90/15399 | 12/1990 |
| WO | WO 96/23275 | 4/1995 |
| WO | WO 95/32485 | 5/1995 |
| WO | WO 96/00424 | 6/1995 |
| WO | WO 96/01453 | 6/1995 |
| WO | WO 96/39675 | 6/1995 |
| WO | WO 96/39677 | 6/1995 |
| WO | WO 97/03411 | 7/1995 |
| WO | WO 96/08787 | 9/1995 |
| WO | WO 96/15506 | 11/1995 |
| WO | WO 96/15507 | 11/1995 |
| WO | WO 96/09607 | 3/1996 |
| WO | WO 97/04578 | 5/1996 |
| WO | WO 97/18526 | 11/1996 |
| WO | WO 97/20284 | 11/1996 |
| WO | WO 97/20286 | 6/1997 |
| WO | WO 97/44758 | 11/1997 |
| ZA | 9500149 | 1/1995 |

*Primary Examiner*—Daniel G. Mariam
(74) *Attorney, Agent, or Firm*—Drinker Biddle & Reath LLP

(57) ABSTRACT

An apparatus and method for inputting a hand-generated character into a computer. A user draws a character using a drawing apparatus. As the user draws, movement of the apparatus and characteristics of such movement are detected. The apparatus generates a code for the character being drawn as a time dependent sequence of signals by comparing the characteristics of the movement as the character is drawn with a predetermined set of characteristics, with each signal corresponding to the predetermined characteristic closest to the actual characteristic detected at each successive step of movement. The apparatus provides visual feedback to the user by displaying in sequence each component of a character that is being drawn positionally independently of the movement of the drawing apparatus.

41 Claims, 16 Drawing Sheets

U.S. PATENT DOCUMENTS

| | | | | |
|---|---|---|---|---|
| 4,794,208 A | | 12/1988 | Watson | 178/19.06 |
| 4,806,707 A | * | 2/1989 | Landmeier | 178/19.05 |
| 4,820,886 A | | 4/1989 | Watson | 178/20.02 |
| 4,831,216 A | | 5/1989 | Landmeier | 178/18.07 |
| 4,835,347 A | | 5/1989 | Watson | 178/18.07 |
| 4,853,499 A | | 8/1989 | Watson | 178/20.02 |
| 4,905,007 A | | 2/1990 | Rohm | 341/173 |
| 4,953,226 A | * | 8/1990 | Matsuyama | 382/189 |
| 4,972,496 A | * | 11/1990 | Sklarew | 382/187 |
| 5,029,223 A | | 7/1991 | Fujisaki | 382/187 |
| 5,155,813 A | | 10/1992 | Donoghue et al. | 345/179 |
| 5,303,312 A | * | 4/1994 | Comerford et al. | 382/189 |
| 5,465,325 A | | 11/1995 | Capps et al. | 345/441 |
| 5,521,986 A | * | 5/1996 | Curtin, II et al. | 382/187 |
| 5,544,262 A | | 8/1996 | Pagallo | 382/189 |
| 5,544,265 A | | 8/1996 | Bozinovic et al. | 382/203 |
| 5,555,363 A | * | 9/1996 | Tou et al. | 707/541 |
| 5,559,942 A | | 9/1996 | Gough et al. | 345/802 |
| 5,566,248 A | | 10/1996 | Ulrich | 414/416.03 |
| 5,583,946 A | | 12/1996 | Gourdol | 382/187 |
| 5,590,219 A | | 12/1996 | Gourdol | 382/202 |
| 5,596,350 A | | 1/1997 | Capps et al. | 345/173 |
| 5,608,624 A | | 3/1997 | Luciw | 715/532 |
| 5,615,285 A | | 3/1997 | Beernink | 382/189 |
| 5,621,817 A | | 4/1997 | Bozinovic et al. | 382/189 |
| 5,623,345 A | | 4/1997 | Merchant et al. | 358/407 |
| 5,627,914 A | | 5/1997 | Pagallo | 382/189 |
| 5,633,955 A | | 5/1997 | Bozinovic et al. | 382/187 |
| 5,656,804 A | * | 8/1997 | Barkan et al. | 235/472.01 |
| 5,666,438 A | | 9/1997 | Beernink et al. | 382/189 |
| 5,673,337 A | * | 9/1997 | Gallo et al. | 382/187 |
| 5,675,665 A | | 10/1997 | Lyon | 382/229 |
| 5,677,710 A | | 10/1997 | Thompson-Rohrlich | 345/173 |
| 5,682,439 A | | 10/1997 | Beernink et al. | 382/187 |
| 5,959,260 A | | 9/1999 | Hoghooghi et al. | 178/18.03 |
| 6,011,865 A | | 1/2000 | Fujisaki et al. | 382/189 |

* cited by examiner

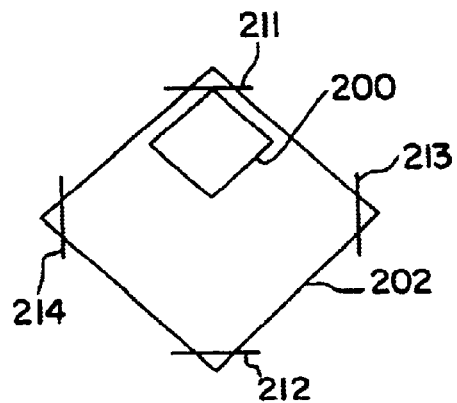
F I G. 8A
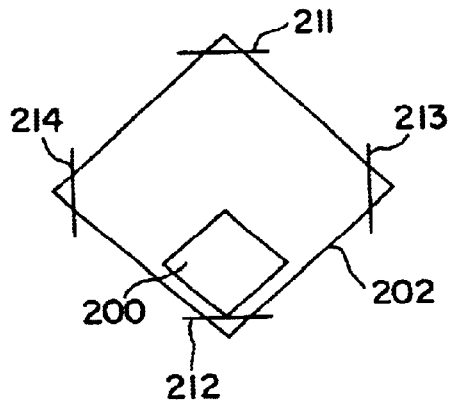
F I G. 8B
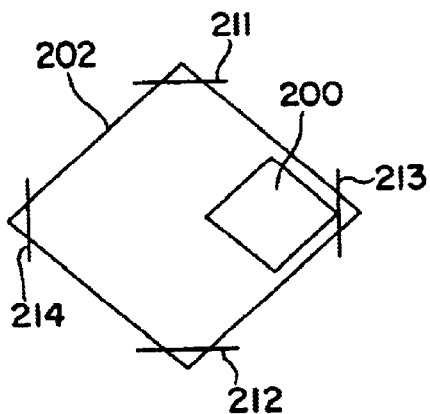
F I G. 8C
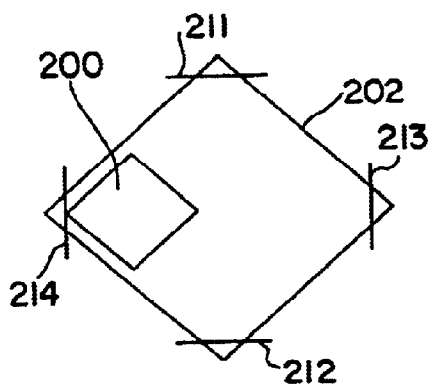
F I G. 8D

| CHARACTER | Number of Unit Vectors | Unit Vector Sequence | Animated Cursive Character Form |
|---|---|---|---|
| l | 2 | UD | *l* |
| t | 3 | UDR | *t* |
| k | 4 | UDRL | *k* |
| b | 5 | UDRUL | *b* |
| h | 5 | UDURD | *h* |
| b | 6 | UDURDL | *b* |
| i | 1 | D | *i* |
| j | 2 | DL | *j* |
| v | 2 | DU | *v* |
| r | 3 | DUR | *r* |
| w | 4 | DUDU | *w* |
| n | 4 | DURD | *n* |
| p | 5 | DURDL | *p* |
| m | 7 | DURDURD | *m* |
| u | 3 | DRU | *u* |
| y | 5 | DRUDL | *y* |
| 4 | 4 | DRUD | *4* |
| 1 | 3 | DLR | *1* |
| 7 | 2 | RD | *7* |
| 2 | 4 | RDLR | *2* |
| 0 | 4 | RDLU | *0* |
| 0 | 4 | DLUR | *0* |
| x | 2 | RL | *x* |

FIG. 9A

| CHARACTER | Number of Unit Vectors | Unit Vector Sequence | Animated Cursive Character Form |
|---|---|---|---|
| z | 3 | RLR | z |
| 3 | 5 | RLRDL | 3 |
| e | 5 | RULDR | e |
| d | 6 | RLDRUD | d |
| q | 7 | RLDRUDR | q |
| q | 7 | RLDRUDU | q |
| f | 2 | LD | f |
| c | 3 | LDR | c |
| o | 4 | LDRU | o |
| 6 | 5 | LDRUL | 6 |
| a | 5 | LDRUD | a |
| g | 6 | LDRUDL | g |
| q | 6 | LDRUDR | q |
| q | 6 | LDRUDU | q |
| s | 3 | LRL | s |
| 8 | 4 | LRLR | 8 |
| 9 | 3 | LRD | 9 |
| 5 | 4 | LRDL | 5 |

FIG. 9B

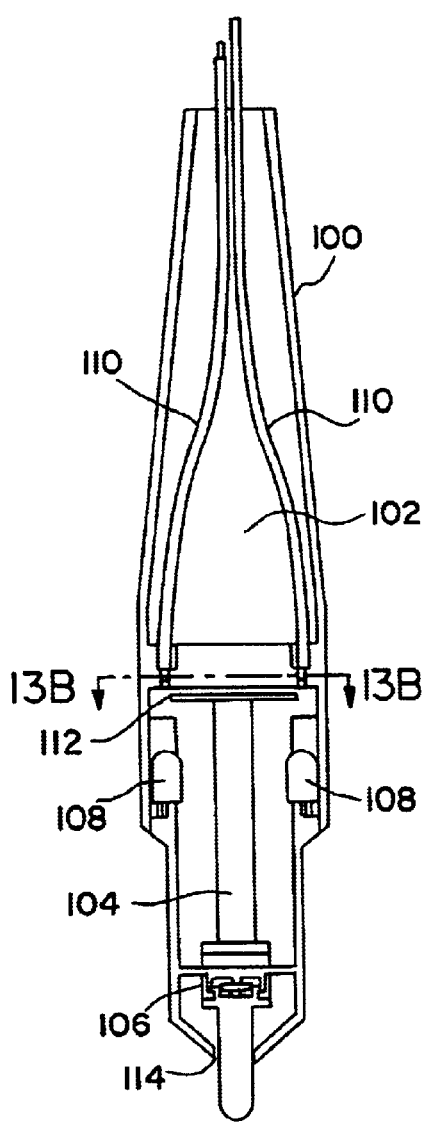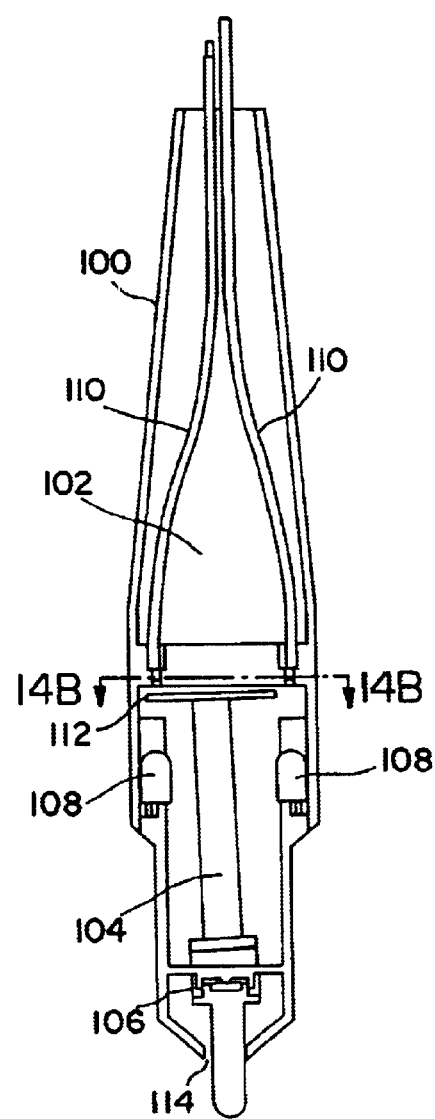
FIG. 13A    FIG. 14A
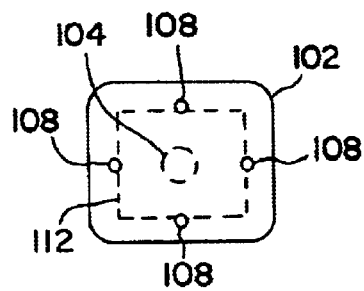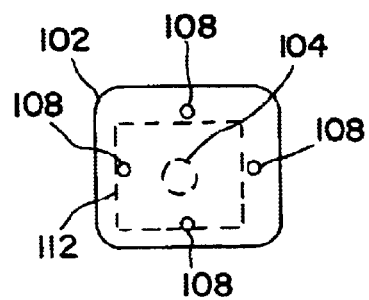
FIG. 13B    FIG. 14B

MEANS FOR INPUTTING CHARACTERS OR COMMANDS INTO A COMPUTER

BACKGROUND OF THE INVENTION

1. Field of the Invention

This invention concerns means for inputting characters or commands into a computer or other information receiving device without a keyboard or the like using the automatic skills of handwriting.

2. Description of the Related Art

The present day computer keyboard was initially designed to operate a typewriter. The keys were operated as levers to stamp a die onto paper to print each character. Each key carried two characters one above the other, the lower case character being reproduced by normal depression of a key onto paper with an ink ribbon therebetween and the upper case character being obtained by shifting the entire paper carriage or die set so that the impact occurs with the upper character die impression rather than the lower. Punctuation and special characters were obtained by shifting the numbers or with extra keys.

The printing method is fundamentally the same as in a printing press but the purpose of a typewriter is very different from the purpose of a press. Printing, of course, allows publication of a manuscript and the reproduction of many identical copies of the original manuscript without the effort of handwriting each copy.

The typewriter came into being with the growth of modern commerce and the need for legible business letters. At that time (and indeed presently), handwriting was highly personal and showed great variation. from one person to another. This made handwritten letters, agreements, contracts and other legal documents potentially ambiguous or unclear in meaning. It is this complexity of handwriting which mitigates against current approaches to computer analysis of handwriting.

Variations in handwriting represent simple information embedded in a mass of redundant detail. In modern information and communications, the approach to redundancy in a pattern is to throw large computing power into analysis and recognition. Computer equipment for analysing handwriting is available but does require considerable computing power and hence is relatively expensive and often cannot recognise the handwriting quickly enough, in real time, causing delays to the inputting process.

The analysis employed in such methods depends upon the extraction of salient features from the pattern of handwriting presented to the device and its software. It should be noted that the salient features chosen are often complex and any one may be specific to one character or letter. This implies that the set of such features is large and complex. In addition there exists a number of different ways in which a particular character can be drawn, each of which may contain different salient features. Add to this the difficulty that even with a single way of drawing a particular character, the actual pattern drawn will vary greatly from one person to another. The result is that such approaches to the computer recognition of handwriting have so far been limited in their success and often require a learning process in which the software adjusts to the handwriting of the user or the user learns a way of writing which allows the system to work. The overhead in terms of programme size and computing power required is often expensive and impractical in the application to hand-held computers or personal digital assistants particularly at the smaller end of the scale of size, power and cost (the high volume market of pocket. databanks, diaries, organisers and the like).

Another approach to data input to a computer from finger movements is embodied in systems that require the user to draw each character in a particular way, devoid of ambiguity. This results in a sort of short-hand code which has to be learned by the user. The short-hand forms are often not familiar or readily recognisable as the characters they represent. The result is a commercially successful system but some way removed from natural writing and which needs to be learned and practised.

Another difficulty associated with the current approaches to handwritten input to a computer is the complexity and expense of the hardware required for the sensing of the finger movements. In both the approaches described above, the moment-by-moment and point-by-point form of the motion of the fingers must be sensed, digitised and transmitted to the processor carrying out the analysis and recognition. In many devices currently available this function is performed by a pen or stylus moved by the fingers across a touch sensitive screen. The finger motions are detected by this device and transmitted to the processor, which causes an image of the movement to be displayed on the same screen. Such a complex input device is expensive and can represent a significant proportion of the cost of for example a hand-held computer.

Thus, it is not easy to input hand generated information into a computer in a direct manner.

The printed word, on the other hand, is clear and unambiguous. Every character can be standard in form and scale and easy to read. The printing press sets up its text as a block of lead type which is impressed onto one or more paper pages at a time. This allows the rapid production of many copies of a page. The typewriter, however, needed to be flexible at the level of each character, not at the level of each page. Hence, one key (one print operation) per character. Therefore, the present day keyboard has 60 to 70 keys.

Keyboards which deliver the component parts of each character (one part to one key) have been proposed. Because the form of printed numbers and letters can be simplified (they can be displayed with 7 and 14 segment displays) such a keyboard would only need a relatively small number of keys compared to the standard keyboard. However, such keyboards have not been successful possibly due to the barrier of having to learn a new way of typing which overrides the advantages of such a simple keyboard. It is to be noted that during conventional touch-typing, although the fingers of both hands cover the keys, only one finger is working at a time. With character constructing keyboards as mentioned above, a number of fingers must be employed simultaneously to print a character and so co-ordination skills must be learned by the user. This means that the typing skill called for is less natural than the one-key one-character scheme used by conventional keyboards.

SUMMARY OF THE INVENTION

An object of this invention is to provide means for inputting hand generated information into a computer.

According to one aspect of the invention there is provided means for inputting a hand generated character into a computer comprising means for drawing a character, means for abstracting a sequence of signals as the character is drawn corresponding to components of the character to produce a code representative of that character and means for recognising that code, whereby the character is inputted to the computer.

The signal abstracted preferably corresponds to a quantization of motion as the character is drawn. The signal abstracted may correspond to a change in direction as the character is drawn and/or may correspond to movement beyond one or more defined thresholds in a particular direction as the character is drawn and/or a signal abstracted may correspond to a change in position of the drawing means from one defined area to another defined are on a drawing surface.

According to a second aspect of the invention there is provided means for converting movement or force generated in reproducing a character into a coded signal corresponding to one or more elements of said movement or force that are indicative of the character, whereby the character is recognisable from said coded signal.

According to a third aspect of the invention there is provided a device for converting movement of or force applied to at least a part of said device, said movement or force being imparted by reproduction of a character, into a coded signal corresponding to one or more elements of said movement or force that are indicative of the character, whereby the character is recognisable from said coded signal.

According to a fourth aspect of the invention there is provided means for inputting a hand generated character into a computer having a monitor, comprising means for drawing a character to produce a sequence of signals corresponding to that character, means for converting signals produced for one character into a code representative of that character, means for recognising that code and means for providing visual feedback corresponding to the character being inputted as the character is being drawn.

The means according to this aspect of the invention may be used with any handwriting recognition/input system whether involving quantisation recognition or any other system of handwriting analysis.

According to a fifth aspect of the invention there is provided a visual feedback to the writer on a display screen. Feedback may take the form of a sequential build-up or animation of a character form which itself is produced from the above mentioned coded signal. Feedback may be generated by the processor which is connected to the above mentioned input means or input device or any other suitable input means.

Thus the display screen can show the results of the handwriting recognition process as a feedback of information to guide the writer. It preferably operates step by step as the elements of movement are coded by the input device and includes the aspect of computer recognition in the visual feedback process unlike all prior art. It does not indicate the moment by moment movement of the fingers or the point by point form of the character as drawn, as is the case with current approaches to handwriting input to a computer. The user is guided by the interpretation of the finger movements by the system, so as to be able easily and naturally to produce just the correct finger movements that will code as the correct sequence of elements of unambiguous recognition of the writing.

Preferably the visual feedback means comprises means for producing on a monitor a graphic simulation of a character component in response to an abstracted signal. The graphic simulation is preferably modifiable in response to a subsequent signal of a sequence for a character.

The graphic simulation preferably further includes an indicator as to position of the drawing means on a drawing surface. The indicator may comprise an icon displayed at or near an end of the latest graphic simulation component. Alternatively, the indicator may comprise an icon that moves around the graphic simulation of a character in response to movement of the drawing means.

The feedback can be a smoothly produced animation of a cursive character form that responds during its formation to the incoming flow of recognised elements or signal codes.

The computer or input device appears to the user to be cooperating in the process of writing and to be producing the characters on the screen from the prompting provided by the finger movements.

Of course, the characters shown on the screen are not representative of the actual locus or form of the movement of the fingers, but are synthetic representations of the intent of the user, and merely guide the user in the inputting process. From the user's point of view the characters seem to appear as if written by the user, with the cooperation of the computer.

Such characters can build up to display a completed word, for example, in a standard, clear, joined-up cursive writing, each character of which has been produced from the sequence of simple elements produced by or abstracted from the operation of the input device.

When the user lifts the pen or signals the end of a word in an appropriate. manner, then the processor can immediately replace the cursive characters with the same word displayed in a selected font appropriate to the application or application programme.

In contradistinction to prior art handwriting analysis systems which input information describing the character as drawn and carry out an extraction of salient features (necessarily scale and speed independent), followed by comparison with a stored library of possible shapes, strokes and their inter-relationships, both spatial and temporal, to give the best fit to one character of a complete character set, and thence to the recognised code for the character, the system of the present invention is a direct encoding system where the movements generating the character as drawn, are compared with a single template in such a way that complacent movements directly produce the elements of a code that identifies the character completely by the time the character is completed. At the instant the character is completed, the recognisable code has been completely built and no further analysis or processing is required for recognition.

Preferably recognition occurs character by character in real time. The one or more elements of movement or force are preferably unit vectors.

Preferably analysis of movements or forces into elements is by means of quantizing said movements or forces into one or a sequence of unit vectors. These elements are preferably speed independent, are preferably scale independent and are preferably substantially independent of distortions or variations in the character as reproduced.

Preferably the elements form a set common to all the characters to be reproduced, which set does not contain elements specific to only one or a few characters.

The signal is preferably recognisable by a computer or any other information handling device to which the device is connected, whereby the character can be displayed on a visual display unit operated by the computer or can be processed in the same manner as a character input from a keyboard.

If an input device were activated by movements similar to those employed in writing, then this could provide a method of inputting characters and text into a computer without the need to learn a completely new skill.

What is here described is a device providing a method of analysis which is mechanical or automatic and does not require an indirect process of analysis and comparison to produce a unique code for a character, in contrast to prior art.

This automatic generation of a unique character code may be facilitated by means of a visual feedback from a display of the recognised elements of a character as synthesised from the signal from the input device.

The automatic switch-like method of extracting the coded signal from the finger movements gives rise to relatively simple and inexpensive input devices, recognition contemporaneous with the completion of a handwritten character, low computing power requirement, natural character forms and ease of learning and use, in contrast to prior art.

Thus the invention herein described allows data input to a computer or other system by means of the natural finger movements employed in writing utilising simple and low cost input devices with high speed recognition and visual feedback.

There is an advantage to detecting motion as it is happening as opposed to analysing the space pattern of completed handwriting. The motion of a pen when writing the circle of the letter "a" is different from the motion when writing the circle of the letter "p", although the resulting shapes are very similar. The "a" circle is normally produced by an anti-clockwise motion whilst the "p" circle is normally made with a clockwise motion. This distinction is lost if the resultant handwritten character is considered after it has been written. However, if the handwriting is analysed dynamically, as it is being written, then the information gained is far more useful. It will be appreciated that references to detection of movement include detection of applied forces in generating said movements.

In a preferred embodiment the drawing means will be a hand held pen or the like, whereby the pen or a part thereof can be moved to reproduce characters.

It is envisaged that the drawing means of the invention will have a part that may be moved relative to a real or notional template when a character is being reproduced and that the drawing means will include means for detecting said movement relative to the template. The template may be incorporated in the drawing means itself or may be separate therefrom. There are various ways in which the movement of said part of the drawing means may be detected.

For example it may be possible to have a template around which said part of the drawing means can be moved, whereby contact of that part of the drawing means on a sensor in a particular part of the template will indicate a direction of movement and again one movement or a sequence of movements will generate a signal corresponding to the character being reproduced by those movements.

Put another way assuming a pen having a body, writing tip and a real template, the template may be separate from the pen, such as on a surface, may be fixed to the pen body or may be fixed to the tip. On the other hand, for a pen having a body and a writing tip, movement of either or both may be relative to a notional template associated with the body, the tip or a separate surface.

The means for detecting a movement of the drawing means or that part thereof may include contact switches, magnetic or capacitive sensors, optical encoders, light detectors, voltage changes, piezo-electric crystal activation or any other suitable means.

The system of the invention preferably includes means for signalling completion of a drawn character. Completion may be signalled by lifting the drawing means from a drawing surface. Alternatively, completion of a character may be indicated by a unique movement of the drawing means relative to that character. Another alternative may be to indicate completion of a character by movement of one of the drawing means and an icon indicative of the drawing means to a defined position, possibly on the drawing surface or an area defined on a monitor.

The mode of analysis envisaged by the invention is actually concerned with the time patterns of muscle action, in contrast to the space patterns of completed handwriting. It is relevant to note that all communication occurs through the medium of muscle action, whether speech, body language, touch, action, handwriting or typing. The first outward expression of thought is always through muscular action. This invention is aimed at allowing the communication with a computer to take place at the level of the neuromuscular skill of writing.

It will be appreciated, however, that there is considerable redundancy present in handwriting. Although handwriting may be taught in a uniform fashion, variations and embellishments are added as a person develops his handwriting skill, so that whilst letters and words can be recognised, it is extremely difficult for, for example, a computer scanning device to extract the essential characters because of personal variations and embellishments.

Accordingly, a preferred aim of the device of the invention is to enable characters to be reproduced as unit vectors. In other words, each character as it is drawn using the device of the invention preferably produces a signal for that character as one or a sequence of steps. This may be achieved by limiting or restricting registration of the movement to one or a series of quantized steps or unit vectors.

It is important to realise that signals which solely describe the position, movement or locus of a pen or moving part of the device simply provide a copy of that movement etc. in electronic, electrical etc form. They do not of themselves facilitate logical recognition of the inputted letter form or character form.

What this invention allows is an automatic reduction of the movement etc into a quantized form. This means that the movement is divided into steps which indicate the time sequence of unit vectors which characterise the movement etc. The steps themselves do not describe the point by point and moment by moment movement which results from drawing the character form. They are rather the result of an analysis of the movement etc which indicates a series of unit vectors. This series of unit vectors cannot be used to reconstruct the original finger movements, because all redundant space and time information is discarded in the process of detecting the unit vector sequence. All that remains is the sequence of the unit vectors and the character of the unit vectors.

The character of the unit vectors will be dependent on the design of the device. In the case of a physical square template the unit vectors could be characterised for example as being up, down, left or right.

The time delay between one unit vector and the next is not of importance and is discarded information. All that matters for recognition is the sequence, eg. left then down then right then up then down for the handwritten letter form "a".

Also the process of deriving the unit vectors disregards the scale or size of the movement or letter form. The same sequence of the same unit vectors results from a large "a" as from a small "a". In addition, provided the physical movements which activate the movement or position detectors are smaller than the smallest character to be drawn, the sequence of unit vectors will be the same for wide variations or distortions in the form of the original character, letter or resulting motion.

It should be noted that such a family of unit vectors (one simple case being: UP, DOWN, LEFT, RIGHT) can represent all the characters to he input to a computer etc through finger movements.

In other words, each and every number, letter etc can be analysed into a sequence of the same set or family of unit vectors. The uniqueness of character resides in the sequence of the unit vectors which represents a unique code for the character. The different characters do not require analysis into unique individual features as in the prior art.

The analysis of original motion into unit vectors is according to a scheme which compares the movement to an arrangement of detectors placed in a fixed relation to a real or notional template. This allows the motion to be compared with the geometry of a template in such a way that a complacent movement will result in a single signal or part of a signal which indicates the characteristic direction or movement at that stage of the drawing of the letter or character etc.

For example, once the moving part has gone beyond the upper limit of detection, the unit vector will indicate simply "up" until the moving part has once again returned within the scope of detection in the direction, when it could be followed by "down". Similarly with horizontal movement. This approach leads naturally to a description of operation of the device in terms of a template.

The template is simply the geometry which determines the signalling of the unit vectors, and may be a physical form eg. a square aperture within which the pen tip etc. moves, or it may be notional, and is simply the space pattern of detector switching limits in two dimensions or it may be embodied in the movement analysing processor which is connected to the input device moved by the fingers.

Either scheme will result in practical devices which convert the finger and hand movement familiar to us as handwriting into a code signals which is logically recognisable as corresponding to the character drawn.

For accuracy of coding, and in order to remove the inaccuracies introduced by personal embellishments, the writer may be guided by visual feedback from an image on a display screen, and can choose natural character shapes which can be learned quickly and easily.

Thus the device allows "typing" or inputting or textual information into a computer or other automatic text handler (eg. typewriter, portable databank or diary etc.) at handwriting speeds or faster, without the need to learn the far more complicated skills of touch typing using a conventional keyboard.

The principle of operation is based on the quantization of motion, and is not to be confused with handwriting analysis which causes automatic recognition of the form of normal personal handwriting (or even the recognition of a limited or defined or stylised set of character forms) by an analysis of its complex actual shape.

The aim of the template either real or notional is to register the movement of the device as unit vectors but not necessarily to restrict the movement of the device to unit vector form, whereby a recognisable signal corresponding to that character can be produced.

In preferred forms of the invention the relation between the template and the part or parts of the device will be flexible, thereby freeing the device from performing forced angular, rectangular or linear movements. In other words, by introducing a flexible linkage between relatively movable parts of the device or between a movable part of the device and the template, the device can follow both straight and curved lines whilst those movements will be detected as straight line movements or forces producing unit vectors.

Thus, the preferred device of the invention has the ability to detect movements of at least a part thereof in producing a character as one or a sequence of unit vectors to produce a signal corresponding to the character, even when the character is not reproduced in a format constrained by the geometry of the template.

The flexible linkage may take any suitable form. For example, when the tip of a pen device is to be movable relative to the body of the device, the flexible linkage may be provided by one or more elastic members linking the tip to the body.

Various considerations may be taken into account in deciding the nature of the real or notional template.

In one preferred embodiment, the template may be in the form of an enclosure having at spaced positions around its periphery means for detecting movement of said device part from one point to another around the periphery of the enclosure. The enclosure may be of any suitable shape but will preferably be a square or a circle. Preferably four detection positions will be provided at equidistant spacings.

The movable part of the device may be a rod or the like and its movement from one detection point to another may be by any suitable sensor means, such as already suggested above.

In another preferred embodiment, the template may be in the form of a confined track around which the movable part of the device can travel, again with spaced detection points as in the first preferred embodiment.

In a yet further preferred embodiment, the template is notional rather than real and may be embodied in the processor running the requisite software and the movable part of the device may be detectable as being in accordance with a template. Thus, the device of this preferred embodiment of the invention will include means for registering the movement of said movable part as though it were following a template. Thus, the device may be arranged to produce output signals when movement of at least a part thereof exceeds a notional boundary of the notional template.

It will be appreciated that these signals indicate major changes in direction as compared to a template or set of directions or axes. It is possible to derive the signals indicating the unit vectors as changes in velocity or other time derivatives as well as direction or position. Such a derivation is suited to the application of this invention to conventional computer pointing equipment.

For example the data stream from a computer pointing device such as a mouse, trackball, pen and tablet etc indicates the relative position of the fingers moment by moment. If this data stream is analysed by a computer or dedicated processor in such a manner that excursions of the finger position are compared with a notional template, encoded in an algorithm stored within the computer or processor or its associated memory as a pattern of excursion limits in two dimensions, movements beyond these limits or complacent with the template boundaries can trigger the generation of a sequence of signals, indicative of the unit vectors, which codes uniquely for the character drawn by the fingers which are moving the mouse, trackball, pen and tablet or other pointing device.

This invention will now be further described, by way of example only, with reference to the accompanying drawings, in which:

BRIEF DESCRIPTION OF THE DRAWINGS

FIGS. 8A to D show schematically operation of a pen device utilising frictional forces between its tip and a surface;

FIGS. 9A and 9B show the correspondence of intended character, unit vector sequence and the animated cursive character form used in the visual feedback;

FIGS. 13A and 14A are sectional views through a yet further form of pen device according to the invention; and FIGS. 13B and 14B are sections on lines AA and BB respectively of FIGS. 13A and 14A.

DETAILED DESCRIPTION OF THE EMBODIMENTS

Figure 1:
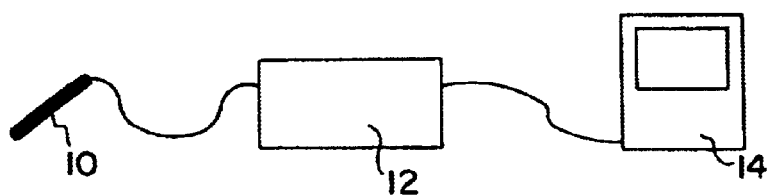
FIG. 1 shows schematically a system for writing into a computer.

Referring to FIG. 1 of the accompanying drawings, there is shown schematically an embodiment of the invention.

A pen device 10 contains a template which constrains the movements performed automatically by the fingers during handwriting and abstracts from these movements the elements that allow computer recognition. The result will be a "pen" which senses the sequence of movement elements in each character while allowing the user to feel as if he is writing in a near-normal way. The sequence of movements can be registered electronically via mechanical switches or optical, electric or magnetic sensors or other means and the sequences decoded by a microprocessor 12 and the characters transmitted to a computer as if from a keyboard and displayed on a visual display unit of computer 14 as they are recognised. Alternatively, the sequence can be transmitted directly for simple logical recognition therein.

Taking this concept a step nearer to a practical form, one of the simplest forms of template is a square and the template could be constrained to move around the pen tip with the pen tip held stationary. Such a pen would feel like being forced to write in a squared handwriting. Add to this a "soft" or flexible linkage, integral with the pen, to allow for writing the circle of, for example, an "a" or a "p".

Figure 2A:
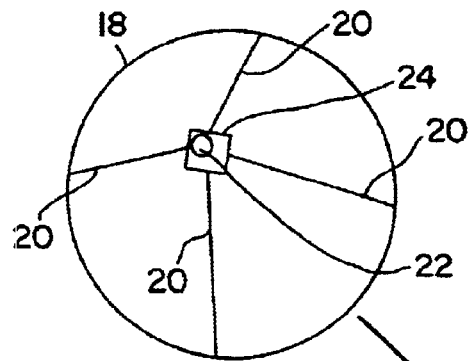
FIGS. 2A and 2B show a possible arrangement for a pen device of the invention.

Such an arrangement as shown in section in FIGS. 2A and B of the accompanying drawings allows the pen to describe a circle while the template moves around the pen tip in four segmented movements. As the pen body 18 is moved in a circle by the fingers, the flexible linkage 20 will stretch to drag the template 24 around the pen tip 22. The forces involved can be quite small—giving a slight tactile feedback to guide the user. As the template is within the pen body, and is smaller than the smallest circle drawn by the user, the template will be pulled against the pen tip sides by the slight force of the stretched flexible linkage. The relative movement of the pen tip and template is, therefore, constrained to the four possible segments of the square template.

Figure 2B:
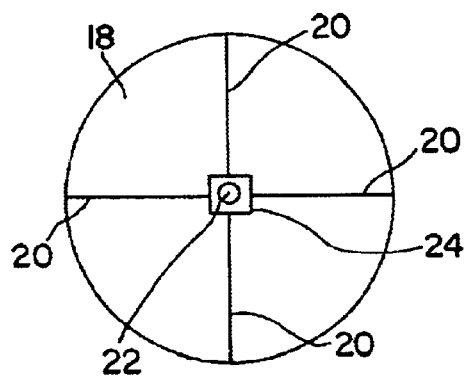

FIG. 2B shows the pen at rest and FIG. 2A shows the pen moved in the direction of arrow F.

These segments can be thought of as "unit vectors" which can be one of the following: up down left right or u d l or r. Thus the sequence of movements for the "a" circle would be detected as:

l, d, r, u and the sequence for the "p" circle will be"

r, d, l, u

Figure 3A:
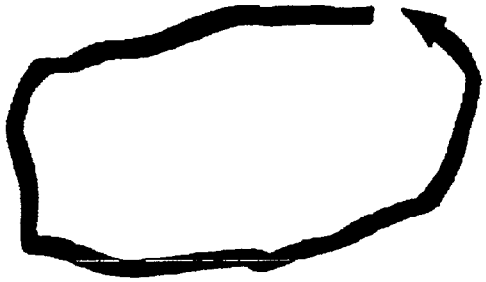
FIGS. 3A and 3B show possible movement of the pen body of FIG. 2 and the resulting sequence of unit vectors around the template.
Figure 3B:
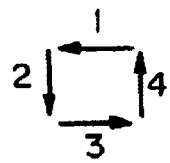

FIGS. 3A and B show respectively how a letter might be drawn with the pen of FIG. 2 and the resultant sequence of unit vectors. This sequence of unit vectors will be the same with a wide variation of circle shapes such as shown in FIG. 4 of the accompanying drawings.

Figure 4:
FIG. 4 shows alternative forms of a letter, each of which can be represented by the same sequence of constrained movements.

In FIG. 4, if all the circles were drawn clockwise starting with the pen tip in the top right of the template then they would all produce the same sequence of unit vectors:

d, l, u, r and yet the user would feel that he was drawing a free form circle.

In a practical form of this pen the body would be moved by the fingers while the tip would be pressed onto a surface and held still. The template could then be integral with, and inside, the pen body (a typical template equivalent size is 0.5 mm per side) and the tip would simply be the lower end of a spine rod that extended up the central hollow of the pen, and connected to the pen body through the flexible linkage and thus be constrained to move around the sides of the square template. The user would feel that he was writing in a near normal way while the finger movements would be converted into a sequence of unit vectors.

It turns out that a square template, for example, can code uniquely for all the lower case letters of the English alphabet and for the numerals 0–9.

In order for this device to be useful in producing movement sequences recognisable by a computer as characters, it is necessary to explore the unit vector conversion of each character in the character set a-Z and 0–9. The character forms are desirably intuitive and simple. It is proposed to write in lower case and shift to upper case (for example with a simultaneous modifier key mounted on the pen body). A shift key could allow the input of capital letters and the special characters ! @ u$ ~& etc as with the standard keyboard. Thus, writing the character "a" while the shift key is down could give "A".

Further modifier keys, for example "option", could be employed to generate commands to the computer.

It will be noted that many redundant codes of unit vectors are available for the special characters, punctuation and commands.

For example a single "left" movement giving the L unit vector could delete the last character input, with the same result as pressing the "delete" key on a computer keyboard.

To determine the start and end of each character a signal could be generated by a switch inside the pen body activated by the pressure of the pen tip on the surface or by a third key. This key would be pressed while "writing" a character and released at the end of the character sequence. The action becomes swift and automatic with a little practice. The end-signal would initiate the unit vector sequence analysis, a look-up algorithm lasting a few microseconds, and the character would then appear on the computer screen.

In another embodiment of this invention, the character end can be signalled by a slight pause (for example while the visual feedback device completes the animation of the intended cursive character form on the display screen) and the end of a word is signalled by the writer lifting the pen from the "writing" surface.

Figure 5:
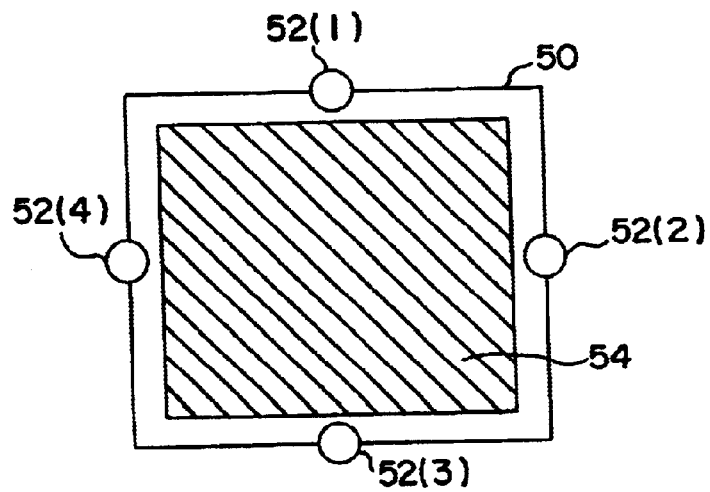
FIG. 5 shows another possible arrangement for a pen device of the invention.

An arrangement for a template is shown in FIG. 5 of the accompanying drawings. A square template 50 has sensor switches 52 (1, 2, 3 and 4) to detect the position of the pen tip 54 (more accurately the spine rod) within the square. These switches 52 are located at the centre of each template side and each switch operates whenever the spine rod is pressing against a particular side. It is the time sequence of these switch transitions that signals the motion of the pen relative to the spine rod and pen tip.

This leads to reduction in the redundancy of the information contained in the motion. Just as in the space domain the variation of form is removed by reducing the motion into notional unit vectors ("unit" implying the transparency of the absolute vector length—only the direction component is abstracted; this being effected by the design of the hardware switching), so in the time domain the variation in timing is removed by abstracting only the order of the switch transitions and disregarding the absolute time intervals involved; this being effected by the design of the software sequencing.

(Note that the spine rod and the template dimensions can be many times larger than the effective template size. The effective size is equal to the possible movement of the spine rod or pen tip within the template. This can be typically 0.5 mm×0.5 mm. Compare this with the movement producing a written "a" having a diameter of about 3 mm).

The sequence of transitions generated by drawing an "a" with the arrangement of FIG. 5 will be:

2-4+1-3+4-2+3-1+1-3+

Figure 6:
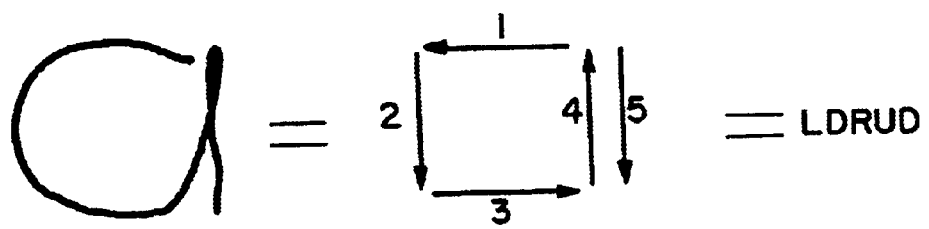
FIG. 6 shows a unit vector sequence resulting from forming a letter.

(where + signifies a switch turning on and– signifies it turning off, the number preceding the sign indicating the switch number). This is because the unit vector sequence for "a" is: l, d, r, u, d starting at the top right of the template (see FIG. 6).

Thus the same sequence of transitions will be generated if the user draws the first curve of the "a" slowly and then speeds up or when he begins quickly and then slows down. All that matters is the relative order of the unit vectors.

Figure 7:
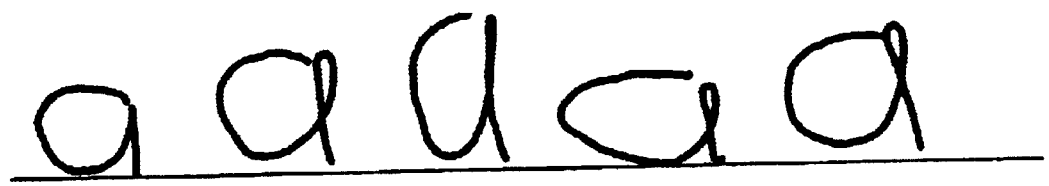
FIG. 7 shows a variety of forms of the same letter that may all produce the unit vector sequence illustrated in FIG. 6.

Also, provided that the miniature square template inside the pen is smaller than the smallest "a" drawn, all the "a"'s shown in FIG. 7 will also encode as:

2-4+1-3+4-2+3-1+1-3+ irrespective of variations of form or scale.

Remember that the fingers move the pen body freely and the relative movement of the tip and the template is effected through a flexible linkage. This means that the character drawn can contain curves yet the template moves around the pen tip in a series of linear steps.

Turning to the question of stylising character forms to facilitate recognition of movement sequences, it is to be remembered that the upper case forms can be generated automatically by the look-up algorithm in response to the lower case unit vector sequence plus a shift key or the like. It is important to realise that the locus of the pen body is invisible. The pen movements are felt not seen. The pen does not "write", it simply signals codes to the computer. The stylised characters which may be used are virtual characters. The mind's eye constructs its own fond image of the character it thinks it is drawing.

Instead of the rigid finger positioning over the conventional keyboard during touch typing, the pen allows a relaxed operation. As the pen does not need to move across the "page" and as the movements may be guided automatically by tactile and/or visual feedback there is absolutely no need to look down at the pen.

One further embodiment of the invention is a pen device shown schematically in FIGS. 8A to D, wherein its tip 200 is held in contact with a "writing" surface and is moved in relation to a real or virtual template 202 by means of the frictional force between the tip and the surface. This will signal the direction of movement of the pen body on it is moved by the fingers and hand. FIGS. 8A to D show respectively the pen moving downwards, upwards, to the left and to the right. As the tip moved under frictional forces, it touches contacts 211, 212, 213 and 214 respectively and thus signals a unit vector sequence. Such a pen is free to move over a surface in the same manner as a conventional pen.

Referring to FIGS. 9A and 9B, these tables show character stylisations which form a character set which is only one example of many possible sets. The optimum set in any particular embodiment of the invention will depend on the template design and the arrangement and logic of the switching and the relationship to the animation sequences chosen to optimise the visual feedback as well as personal preferences.

This set relies on a flexible linkage to give a realistic feel to the drawing of the letters. Obviously the simple square template will not allow excursions (tails) up or down. However the fingers carry these out automatically, the pen body following the fingers, but the spine rod stays within the template square. Happily each character still generates a unique unit vector sequence and codes unambiguously into the target computer.

Obviously the writer will have to adapt the writing of each character to produce just the unit vectors required for error free recognition. However the abundance of codes derivable from sequences of unit vectors allows for multiple ways of drawing particular letters. (See the example of the letters "b" and "q" in the set of FIGS. 9A and 9B).

Most importantly the visual feedback will guide the writer effortlessly if the elements of the animation building the cursive character forms are designed to confirm the completed movements at any point in time and prompt for the required subsequent movements.

Because of the flexible linkage and the mind's own image of what it is telling its fingers to do, these letter forms seem quite natural.

After a little practice, far less than is needed to become skilled at using a conventional keyboard with all these characters, the component movements are not created individually but in a fast automatic flow, as the mind goes through the act of writing each character. The speed can be typically 20 unit vectors per second.

Figure 10:
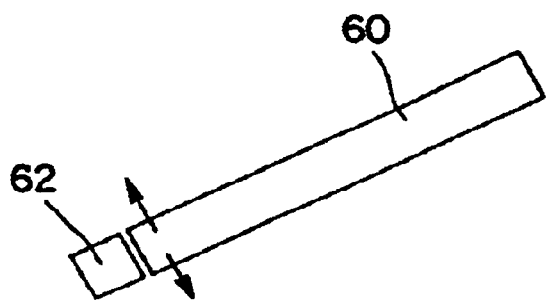
FIGS. 10, 11 and 12 show yet another form of pen device according to the invention.
Figure 11:
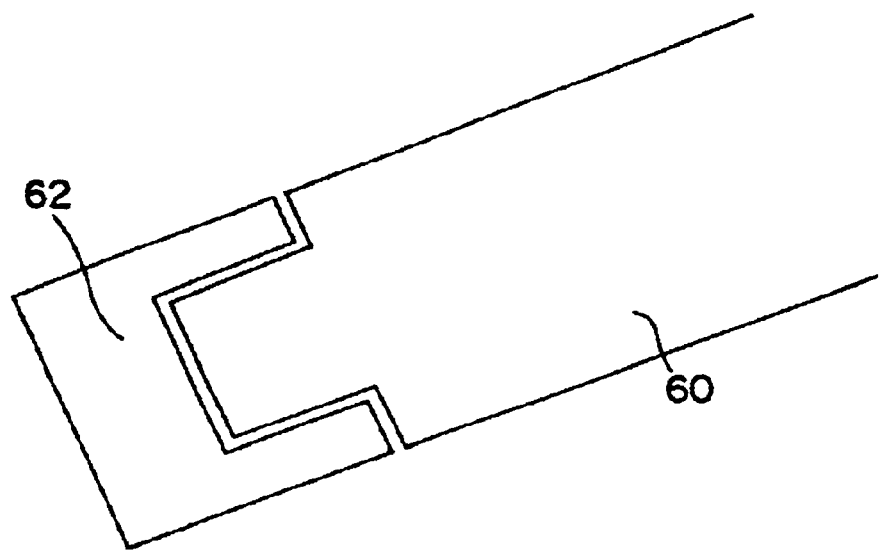
Figure 12:
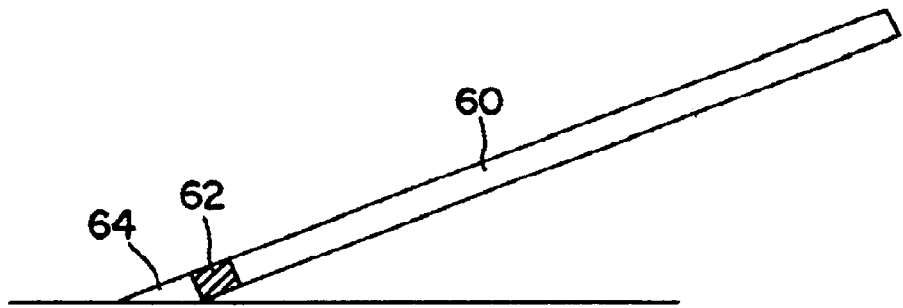

In FIGS. 10, 11 and 12 is shown a form of pen according to the invention in which the pen has a body 60 which is movable relative to a template 62 in the pen tip 64 which is held stationary upon a surface. The pen tip 64 may include a suitably shaped rubber or the like pad which is relatively non-slip upon say a table.

The advantage of this embodiment is that the actual movement of the pen around the template and the imagined movement of the pen tip are equivalent. With the pen described earlier, these movements are opposite in sense and the mental link between the two has to be unlearned. The template may be of any desired shape with movement sensors also of any desired type as described hereinbefore or later.

Another refinement, which may be applicable to four-switch templates and more complex templates, is to generate the character start and end signals from the template switches. The start signal may be turned on whenever at least one of the template switches is on, and may be turned off whenever all four template switches are off. This defines a starting point for the pen tip at the centre of the template. If in addition, the pen tip is centre-sprung, ie. automatically returns to centre after each excursion, either by slightly lifting the pen or simply by relaxing pressure, then the process of sending a character becomes easier and automatic. The logic of the start signal may be handled electronically.

More complicated templates can be constructed, where the freedom of movement of the pen tip is greater. An analogy would be the increasing complexity of car gearshaft gates as the number of gears increases.

When a physical or real template is being used, the effective size of the square template may be reduced until the relative movement of the pen body and the spine rod or pen tip is arbitrarily small. The unit vectors may then be sensed using pressure transducers or strain gauges on each of the four template sides.

Character start/stop signals can be derived logically from the template signals.

A degree of flexible linkage is desirable to allow a very slight movement of the pen under the pressure of the writing fingers. This can be achieved by moulding the pen tip from say rubber or like material, and/or building in a slight compression movement into the pressure transducers or some other convenient position.

The movement of the pen in this arrangement is not constrained so obviously to a square template, however the signals from the transducers will conform to the same coding sequences for the same characters.

Writing control can be effected by means of an audible feedback generated from the vector recognition circuits. For example, as the fingers go through the movements of a particular stylisation, an audible signal can be generated as each vector is completed, the frequency of the sound being arranged to be unique to each vector. After a little practice this feedback could be muted or disabled. The occurrence of a mistake (unrecognised sequence) for a particular character could switch this feature back on for a predetermined number of characters following, thus reinforcing the learning process. Just as when, while dialling a familiar number on a touch-tone telephone, a mistake immediately "sounds" wrong and familiar groups of numbers sound right.

A further feedback to facilitate both learning and the normal operation of the device could be a visual indication of the vectors themselves as they build up to describe a character. Most computer displays operating in word processing mode employ a cursor shape on screen to indicate the insertion point. This could be replaced with say a square representation of a virtual template showing the vectors as emboldened sides of the square (or whichever alternative template shape is used). At character end-signal this graphic would be replaced with the coded character and would itself move on to the next text position, ready to display the next pattern of vectors.

More sophisticated techniques of visual feedback and confirmation may be employed, in which the vector sequence information is used to synthesize a graphic image on screen which reflects the growing character as intended by the operator, using a stored programme to determine the available possibilities at each stage in order to guide the formation of the inputted character.

Figure 18:
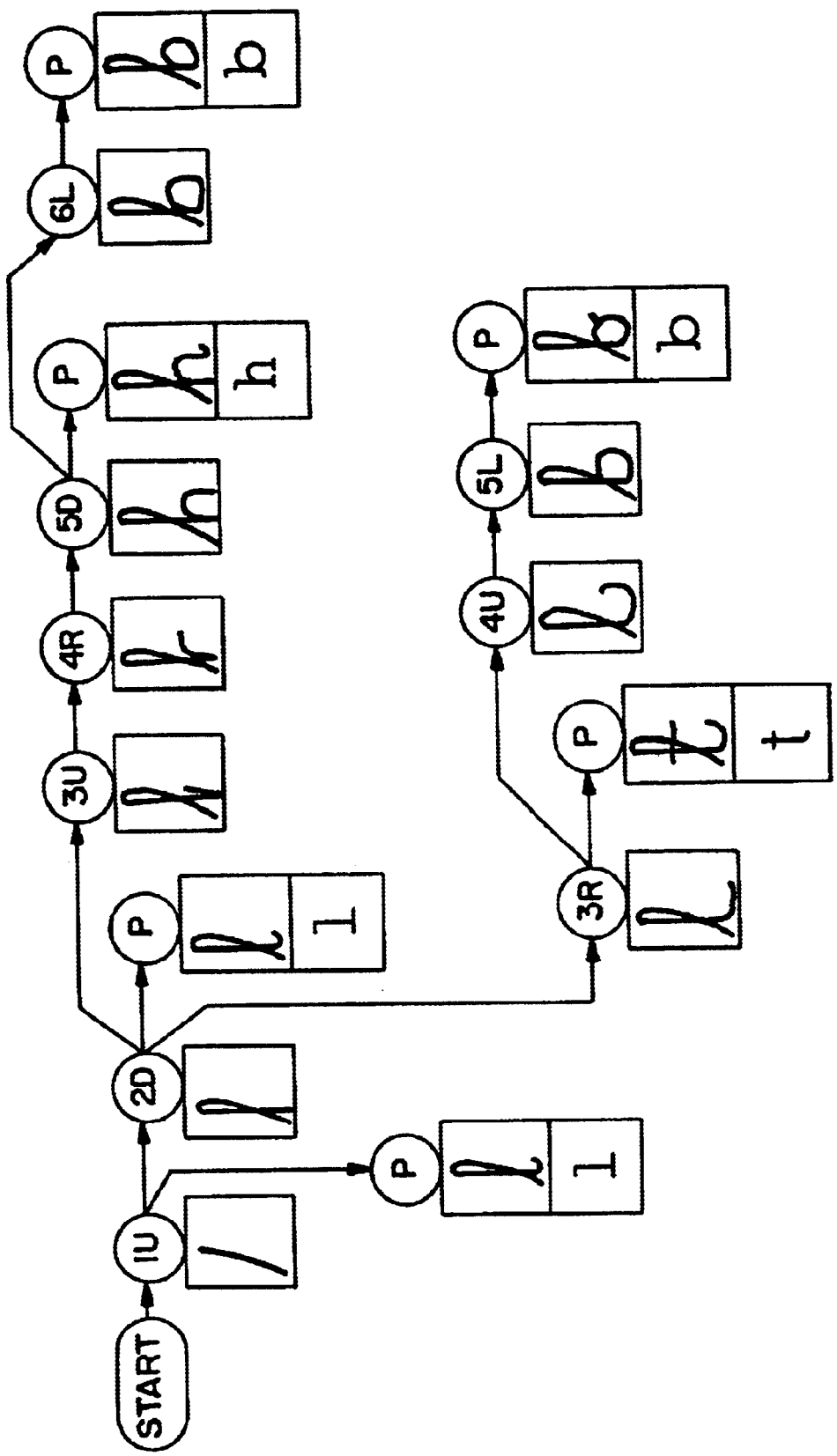
FIG. 18 shows a flow chart illustrating the procedure of synthesising an animated image to be displayed on a screen to provide visual feedback to the writer.

Such a system of visual feedback is illustrated in FIG. 18 which is to be read as a flowchart. Here the way in which characters that all begin with an "UP" unit vector (chosen as an example) may be reproduced on a display screen as a progressively developing image of the intended character in synthesised, clear, standard, cursive form (represented in the square boxes) is illustrated.

In the flowchart of FIG. 18, the sequence of unit vectors is indicated by the symbols in the circles. Thus 1U indicates that the first unit vector is "UP". Similarly, for example, 6L indicates that the sixth unit vector is "LEFT".

At the point of recognition, when the system decodes the finger movement into a unique unit vector sequence for a specific character, then at the corresponding point in the flowchart of FIG. 18 the recognised character is indicated by a square box containing the corresponding font character.

The progressive animation develops each character as the fingers move in drawing the character while holding the input device which converts these movements into a sequence of unit vectors. It is this stream of unit vectors which determines the animation process. Thus the feedback loop is closed allowing a completely novel method of inputting handwritten information into a computer or the like.

In other words the eye sees the character form on the screen as the fingers move in such a way as to produce the unit vector sequence. The computer etc appears to cooperate with the user in the process of writing the characters.

In the example illustrated in FIG. 18 the letters "l" "h" "b" and "t" are reproduced and recognised. It can be seen from this example that all the basic forms of the characters "a" to "z" and "0" to "9" can be similarly analysed into unit vectors and animated on a display screen.

It is important to note that the definitions of the letter forms in terms of the unit vectors bears a functional relationship to the sequence of metamorphosis of the animation of the synthetic on-screen cursive character forms. As the unit vector sequence is generated automatically, the animation responds by developing the letter through the forms possible at each stage. Thus referring to FIG. 18 the letter form for a cursive l transforms into the cursive form for the letter h with the further input of unit vectors U R D. Similarly the h transforms to the form b after an L unit vector. Thus, the design of the cursive font employed in the visual feedback animation contains the structure of the basic handwriting movements as defined by the unit vector sequences (ie simple changes of average direction) as can be easily and automatically detected.

Thus the design of the visual feedback font and the process of its animation is very important. It is envisaged that different such fonts can be designed for different applications, languages, countries and scripts and users.

This gives rise to a device which allows the writing of natural character forms to be elegantly guided by visual feedback, thus placing the brain, fingers, input pen or input device, computer processor, display screen and eye, all in the same feedback loop.

Figure 19:
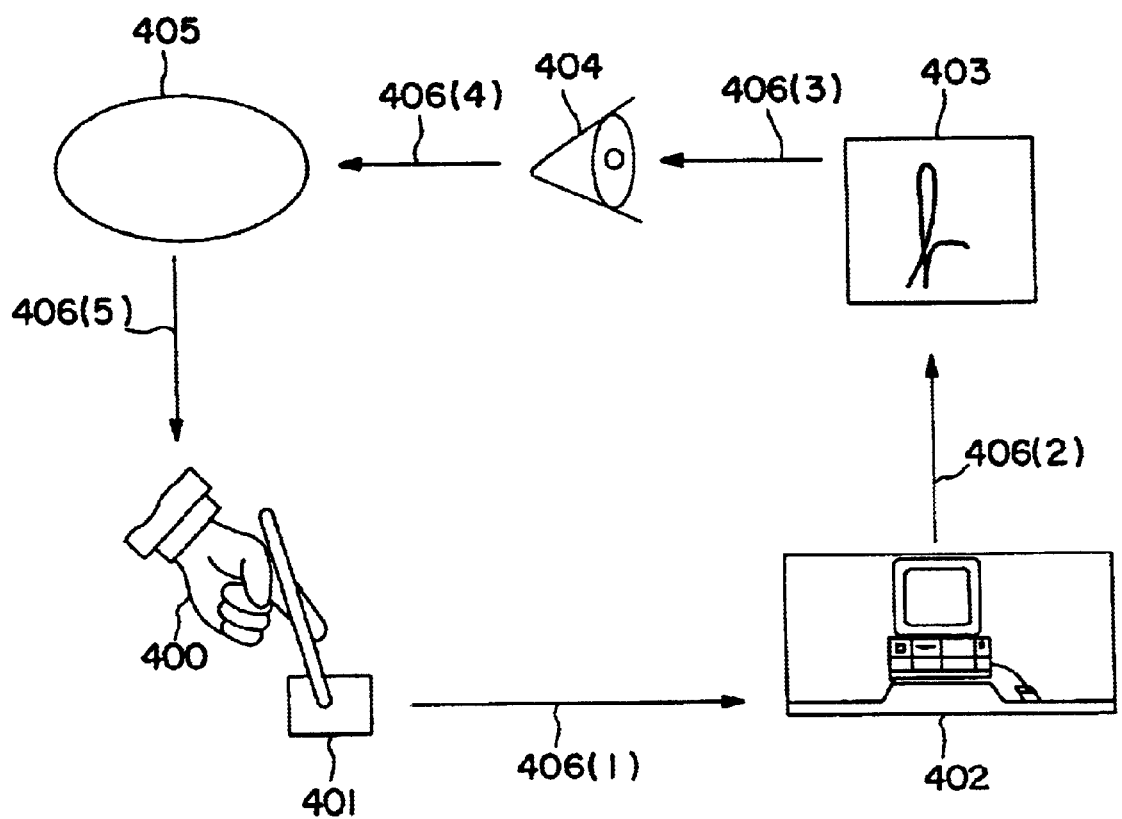
FIG. 19 shows the flow of information in such a system employing an input device of the invention and a method of visual feedback described herein.

FIG. 19 shows this feedback loop. The flow of information is indicated by the arrows 406 (1 to 5). The fingers 400 of the writer perform the movements of writing a character and these movements are detected by the input device 401 which automatically produces signals indicative of the unit vectors characterising the character drawn. These signals are fed to a processor 402 which synthesises an animated image in response to the sequence of these unit vectors. The animated character is displayed on a display screen 403 and viewed by the eye 404 of the writer. Thus the brain 405 of the writer receives feedback according to the development of the unit vector sequence in terms of the development of the synthesised image indicative of the writer's intention, and is able instinctively to correct the movement of the fingers to cause correct computer recognition of the character drawn.

The process of computer recognition is thus included in the total feedback loop involving the user. This is in complete contradistinction to prior art, where the feedback is merely from the reproduction of the actual finger movements on the display screen and does not include the recognition process itself.

The end of each character is signalled in this example by a slight pause in pen movement, shown in FIG. 18 as a letter P in a circle. However, the on-screen animation can produce joined-up cursive handwriting by a simple process of stored instructions responding to the unit vector sequence, and animating the connecting links between letters.

It should be noted that the process of animation can present the user with a continuously moving cursive line on the display screen, in response to the signals from the input device, which may themselves be discontinuous in time. The eye sees what the mind intends, rather than what the fingers are doing. After a very short period of use, the process can become virtually automatic and natural.

At the end of each word the pen or input device may be lifted up just as in normal writing onto paper) to activate a signal (produced automatically from a switch or other sensing means) to the system processor to initiate the transformation of the completed cursive image of the written word on the screen into the corresponding font characters of the application programme etc which is the object of the data input.

It should be noted that each character is recognised at the pause after the last unit vector has been input. In other words the user will pause momentarily after completing each character, while the processor completes the animation of the cursive character form on the display screen. This image of a cursive character form is already a product of the recognition process and has been derived from a unique code of unit vectors already input to the system, and should not be confused with the cursive forms indicative of the actual unrecognised finger movements displayed in inventions of prior art.

In this example the cursive form is displayed on screen until the whole word is completed to facilitate useful feedback to the writer.

It should be understood that the cursive letter form so synthesised and displayed bears a functional relationship to the finger movements employed in writing the character. It would not be so useful to display the "printed" font characters at this point.

The structure of the synthesised character forms is based on the unit vectors that characterise the corresponding written characters. This relationship can be seen in the example of the flowchart of FIG. 18.

The feedback thus guides the writer in a most natural way to input the correct sequence of unit vectors, without consciously having to pay attention to that level of analysis.

Once the whole word is completed the system has all the information required to display the recognised characters in the final form of "printed" font characters to make up the complete printed word.

It is easy to conceive computer learning programmes to take a new user through the structure of the character set stylisations, using graphics and feedbacks similar to those described above.

It is possible to use a virtual template as opposed to a physical template. The character recognition in the physical template systems is facilitated by the simplification of the movement by means of the physical boundary of the template and by the resultant reduction of that movement to scale-independent and speed-independent unit vector sequences.

However, a further refinement is still possible, in which the restriction of the movement by a physical barrier is replaced by a notional limit to the registration of that movement. If movements are only recognised by sensors in directions parallel to the sides of a notional, non-physical template, and if these movements are quantized by the sensors and/or their associated electronics and algorithms up to a specific limit of excursion, and if this limit is smaller than the smallest character drawn, then the end result will be the same for the same character stylisations as with a physical template.

This would lead to the design of physically simpler, faster pens or touch screen sensing of stylus or finger movements and allow the invention to work utilising the input devices now available for computers such as the mouse, tracker ball, finger pad, touch sensitive screen, pressure sensitive screen, pen and digitising tablet and the like.

Further refinements of the invention are described below with reference to FIGS. 20 to 29 of the accompanying drawings.

Characters to be input are defined in terms of the movements required to produce the appropriate unit vector sequence. Therefore, predetermined styles of character are pre-supposed. These characters can be very close and in most cases identical to natural character forms. Characters may be defined in terms of unit vectors in such a way that each character is represented by a unit vector sequence that is not a truncation of any longer unit vector sequence for another character. That can allow continuous input (eg within a word without necessarily signalling in some way completion of a character. Thus, completion of a character may be signalled by the last unit vector of the defined sequence for that character.

Figure 20:
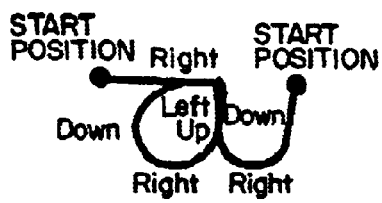
FIG. 20 shows a letter "a" reproduced with an additional movement to indicate completion and start of the next letter.

An example of such a unit vector set follows:

a=rldrud then r for start
b=uddurdl then r for start
c=rldr then r for start
d=rldruudd then r for start
e=ruldr then r for start or ruld then r for start
f=uddu then rr for start
g=rldruddl then r for start
h=uddurd then r for start
i=d then r for start
j=dl then r for start
k=uddrl then r for start
l=udd then r for start
m=dudud then r for start
n=dud then r for start
o=rldru then r for start
p=dduurdl then r for start
q=rldudd then r for start
r=duudr then r for start
s=rudl then r for start
t=udrld then r for start
u=drud then r for start or dru then r
v=du then r for start
w=dudu then r for start
x=rl then r for start
y=druddl then r for start
z=rlrdl then r for start FIG. 20 shows an animated screen image corresponding to movement of a drawing device in drawing a letter "a" according to the above unit vector set. The last RIGHT movement signals the completion of a unique unembedded code for "a" and therefore the end of the character. That can be used to cause the visual animation on the display screen of a line extending to a standard start position for the next character.

The signalling of the end of a word may be achieved by pen lift activating a switch or sensor or other eg button press, or a special unit vector sequence or special movement sequence.

Unit vectors may be derived in the following ways:
from switches detecting motion in a pen device as described above;
from exceeding a threshold of motion in a direction;
from exceeding a threshold of any combination of time derivatives of motion in a direction;
from movement from one defined area of writing surface to another;
from substantial complacency with a direction or axis or template side;
from combinations of the above.

Here substantial complacency means that the resolved vector components of the motion parallel to the direction, axis or template side are greater than those parallel to all other defined directions, axes or template sides in the system.

Figure 21:
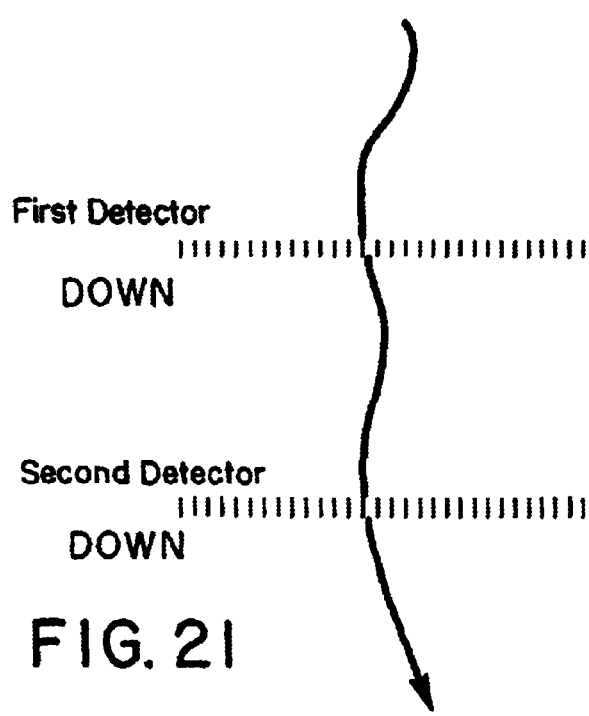
FIG. 21 illustrates detection of double unit vectors.
Figure 22:
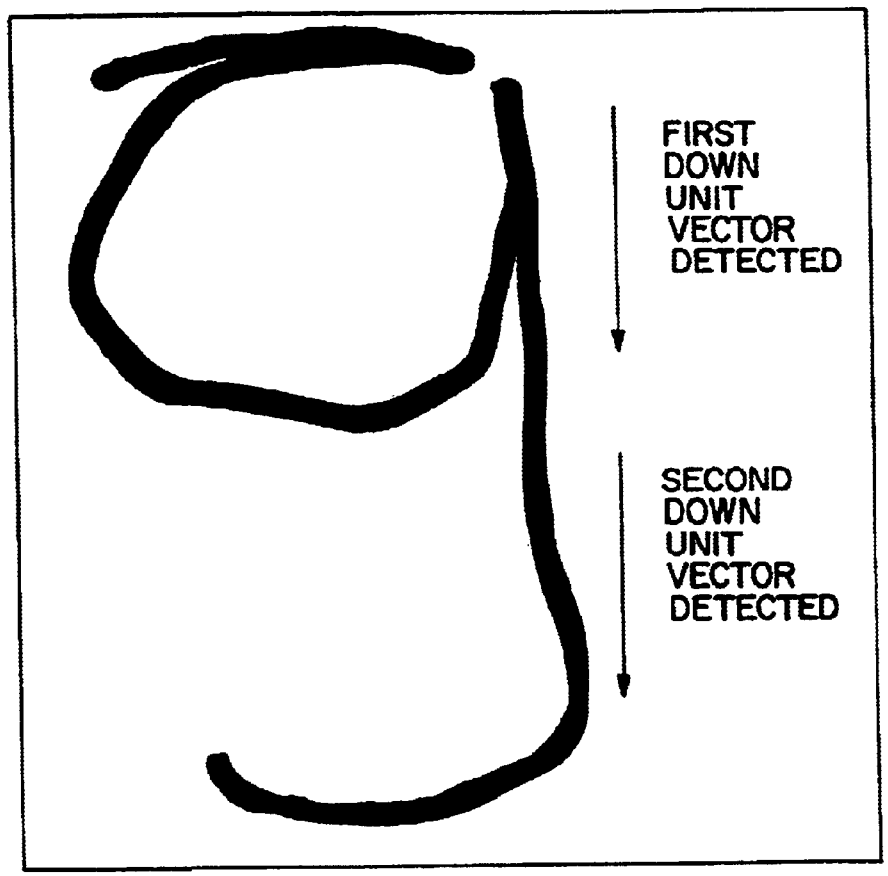
FIG. 22 shows detection of double unit vectors in drawing a letter "g"

To facilitate drawing and recognition of some characters, it may be useful to be able to detect doubling of unit vectors. In other words in drawing some characters unit vectors may repeat one after the other. Detection of two vectors in the same direction may be detected by arranging two detectors with different thresholds of detection or two templates (real or virtual) one after the other so that the movement produces the detection of first one and then the second unit vector in the same direction. This is illustrated in FIGS. 21 and 22 of the drawings. In FIG. 21 the arrow indicates the direction of movement of the drawing device or pointer. FIG. 22 shows how this can be used, for example, for the letter "g".

Pen and pointer devices used in conjunction with computers and associated display screens or monitors often employ the reproduction on the screen of a line of pixels that represents the track or locus of the drawing device. This is some times termed "screen ink". Such a display can be used in conjunction with unit vector detection to guide the user in forming the correct letter shapes.

Figure 23:
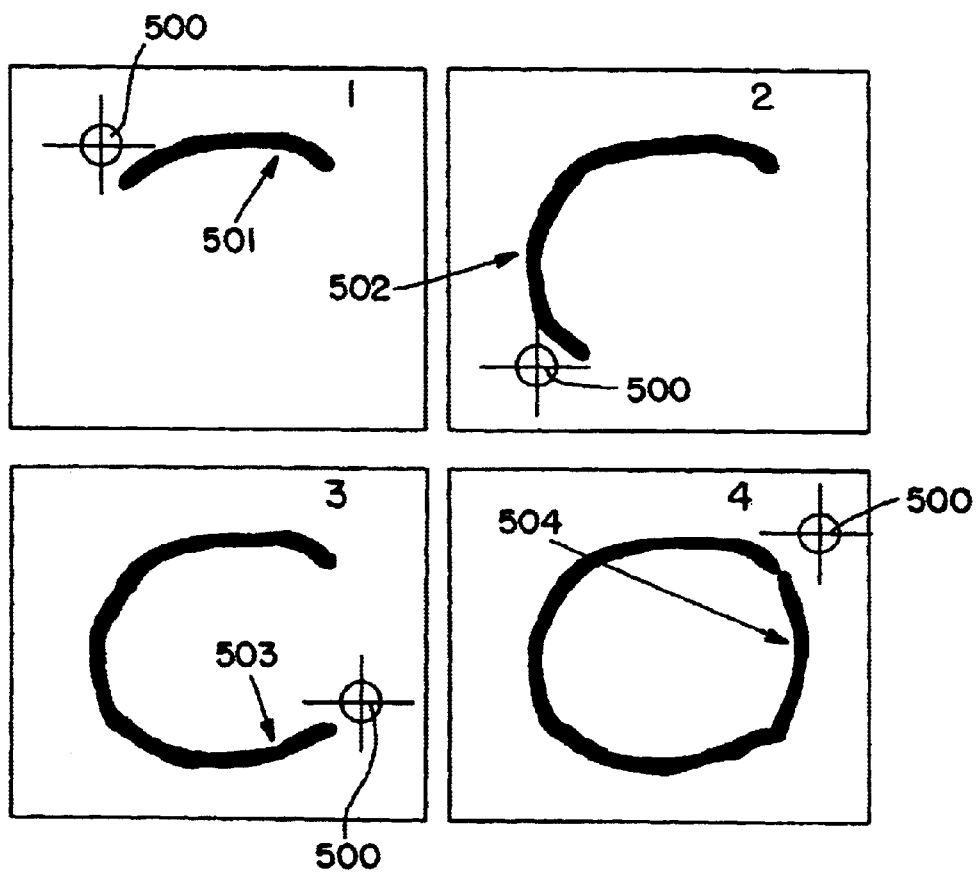
FIG. 23 illustrates provision of an actual pen position icon as a letter is drawn.

Referring to FIG. 23 of the drawings, it is possible to cause an icon on a monitor screen to move in response to the actual movement of the drawing device. The icon 500 can be used to appear adjacent to the animated font providing visual feedback as described above. This allows the user to judge more accurately the movements required to cause correct unit vector recognition, as confirmed by the display of the corresponding animated font elements 501, 502, 503, 504, for example, corresponding to the input of a drawn letter "o".

Figure 24:
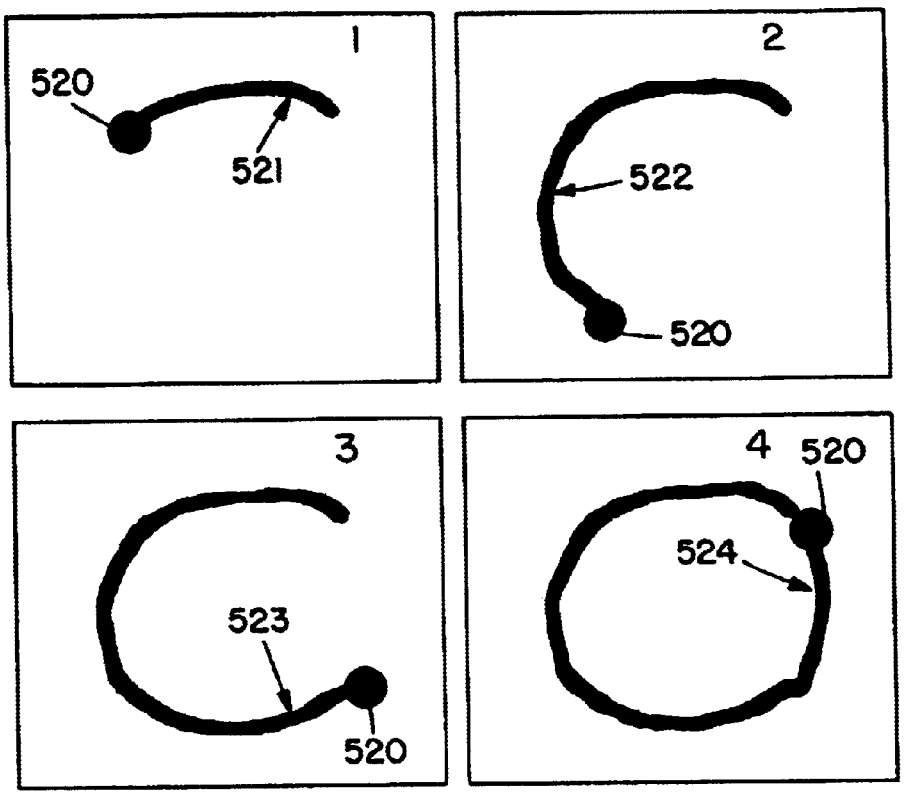
FIG. 24 illustrates provision of a synthetic pen position icon as a letter is drawn.

As the pointing device is moved to produce the display of animated font elements on the monitor screen, it is advantageous to indicate the direction of pen movement and to give a simulacrum of the pen position by causing the processor controlling the monitor to display an icon at the end of each consecutive animated font element. This icon is not to be confused with the icon which responds to and represents the actual drawing device movement. FIG. 24 of the drawings illustrates the sequence of images that result from the input of the letter "o". Icon 520 appears at the end of each animated font element 521, 522, 523 and 524 as the letter "o" is input.

Figure 25:
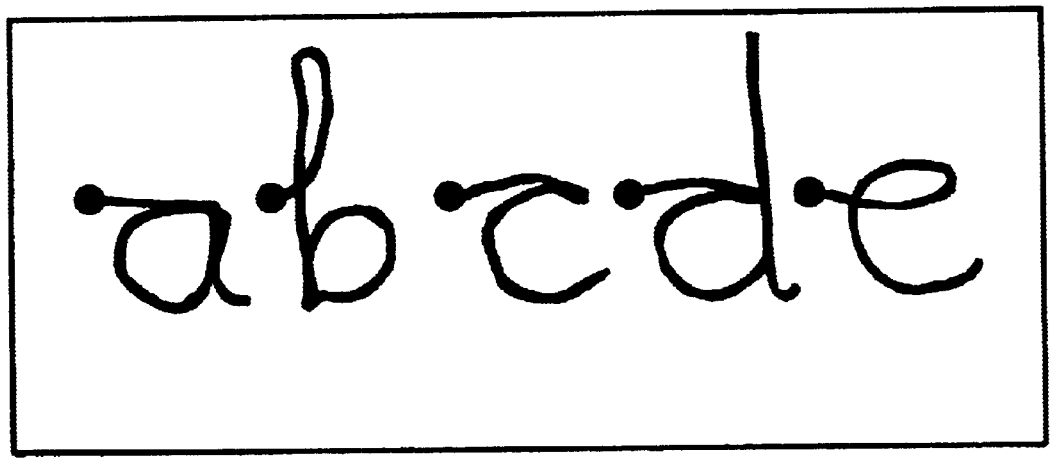
FIG. 25 illustrates how letters may be drawn starting from the same point.

It is advantageous to arrange the drawing of characters so that they all start from the same point. This allows the writer to memorise one set of character forms which do not need mental re-adjustment of the pen position before the input of the next character. This leads to increased speed of writing. FIG. 25 of the drawings shows examples of letters that can be drawn from a common start.

At the end of each character it is advantageous to arrange the visual feedback to move the position of the pen position icon (whether actual or synthetic) from the end position of the character to the standard start position. This immediately re-adjusts the writer's assumption of pen position to facilitate the speedy input of the following character.

The same result may be obtained by advancing the screen ink to the standard start position, or by causing the animation of a font element on the monitor to bridge the gap between the end position and the following standard start position. That is shown, for example, in FIG. 20 of the drawings, where the final right unit vector signals completion of the character "a" and the visual feedback automatically produces a line extending to the common start position.

Figure 26:
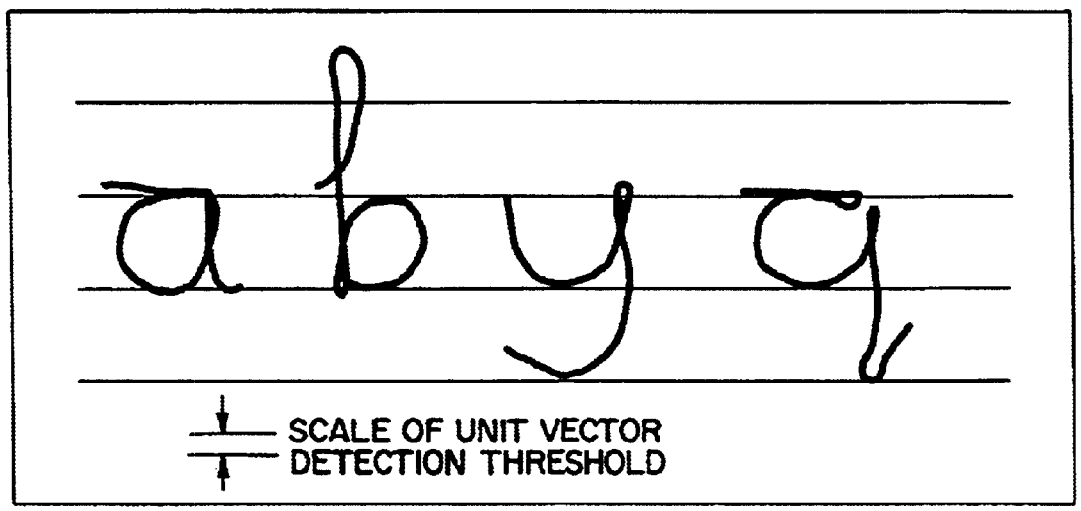
FIG. 26 shows use of guide lines to aid character input.

FIG. 26 illustrates provision of guide lines on a monitor display to aid correct input by providing indications of appropriate relative scale and necessary movement in conjunction with screen ink or actual pen position icon. This ensures a more regular drawing of characters and a scale which is consistent with the scale of the unit vector detection thresholds.

Figure 27:
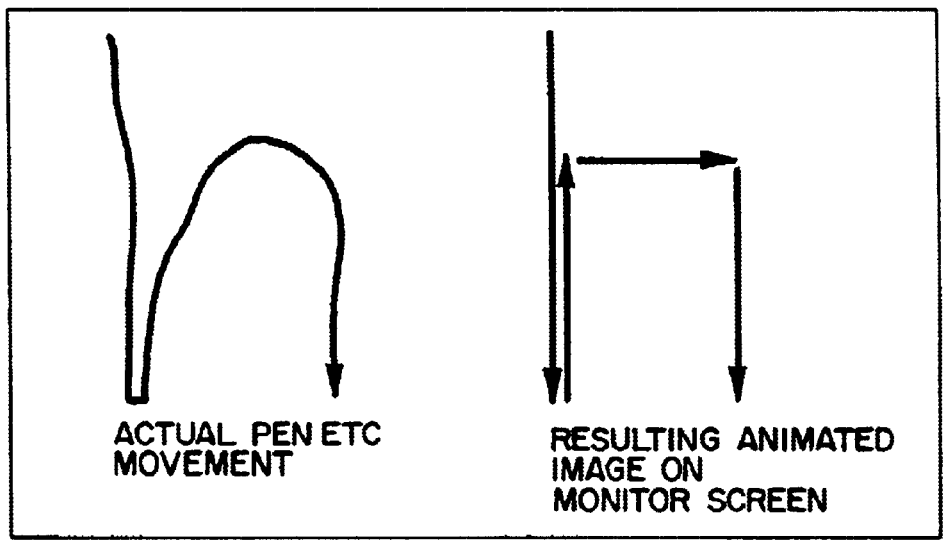
FIG. 27 illustrates visual feedback compared to actual movement of a drawing device.

The use of extending vector images to provide visual feedback is an alternative way of guiding the user in the input of characters to produce correct unit vector sequences. The unit vector detected causes the image displayed of the pointing device movement to be locked to the corresponding direction and allows the input of a line reproduced on the screen that represents the extension of the movement. When the direction of movement changes sufficiently to trigger the recognition of a new unit vector, then the displayed line is locked in the new direction. This visual feedback allows simulacrum images of the intended character shape to be displayed as straight line segments corresponding to the degree of movement in each direction. FIG. 27 illustrates the method.

It is advantageous to use special areas or special guidelines on the display screen used in conjunction with screen ink and/or pointer icon, in order to signal character end and therefore allow continuous input (eg within a word) without lifting the pen device or otherwise needing to signal character end and/or in order to signal control or modifier characters or signals. In this method when the pen position icon and/or screen ink moves into an area of the monitor display surface corresponding to a defined area of the writing surface, or when the pen enters the defined area of the writing surface, or when the pen crosses a defined line on either surface, a signal is produced by the processor which indicates the end of a character or other control event or command.

Figure 28:
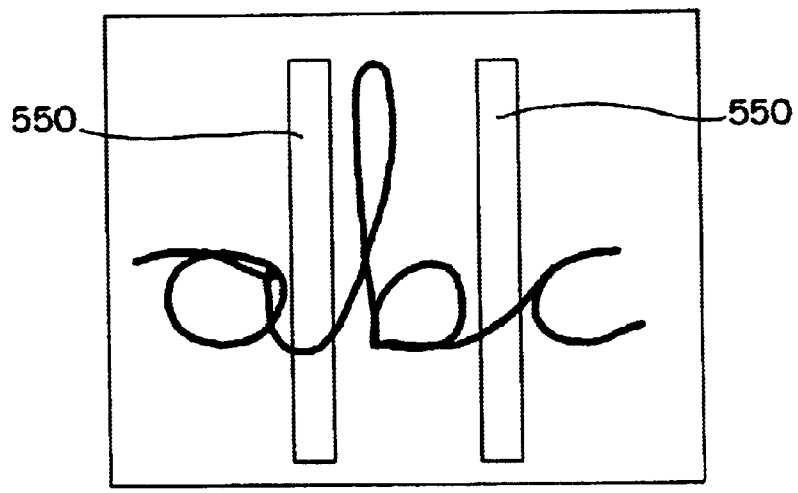
FIG. 28 illustrates a display screen with special areas for signalling completion of a character.

This allows the rapid input of joined-up cursive characters without the need to lift the pen or otherwise signal the end of each character. This is shown in FIG. 28 of the drawings in which movement of screen ink or pen icon into shaded areas 550, signals the end of a character.

Figure 29:
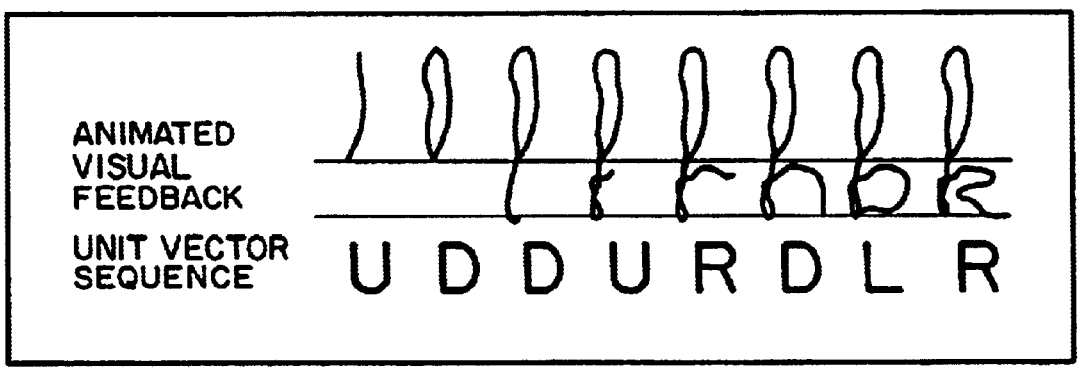
FIG. 29 illustrates visual feedback with modification as new unit vectors are detected.

Visual feedback may include the modification of displayed character elements as new unit vectors are detected. FIG. 29 of the drawings illustrates this method. The seat of the "h" is modified into the circle of the "b" upon detection of the L (left) unit vector. Subsequently, the circle of the "b" is modified into the curl of the "k" on detection of the final R (right) unit vector.

A practical drawing device for use in the invention, which has been built to prove the efficacy of quantisation of motion to produce unit vectors from the finger movements of handwriting, is now described with reference to FIGS. 13A and B and 14A and B of the accompanying drawings. It will be appreciated that many forms of pen can be produced in for use in this invention and that in addition existing computer input devices can be adapted to embody the invention herein described.

These drawings show a pen 100 having a tubular body 102. Extending through the lower end of the body is a rod 104 which is pivotally mounted in the body at 106, so that when the tip of the rod is held stationary on a surface, the pen body can move relative to the tip in directions normal to each other. Within the pen body are four light sources 108 each being at the mid-point of a side of a notional square template. Opposite each light source is an optical fibre 110 for detecting an on or off situation for its own light source, whereby signals can be generated for microprocessor recognition. The rod 104 has a square shutter plate 112 on its upper end, which in a rest position, ie when the rod is centrally aligned with the axis of the pen, all of the light sources are detectable by their corresponding optical fibres 110 but when the pen body is moved relative to the rod, the shutter plate is moved to obscure two of the light sources corresponding to the direction in which the pen is moved. FIGS. 13B and 14B respectively show the shutter in the neutral position and in position where the pen has been pushed to the top right. The pen tip movement is constrained by a square template 114 in the form of an aperture at the end of the pen body through which the pen tip extends. Thus, the pen includes the means for detecting direction of movement of the pen in forming characters in order to generate a signal that can be recognised by a microprocessor or computer to produce the character on a computer screen.

If the pen tip has a built-in flexibility, the fingers can perform circular and curved movements while the signals are generated with reference to the square templates.

Figure 15:
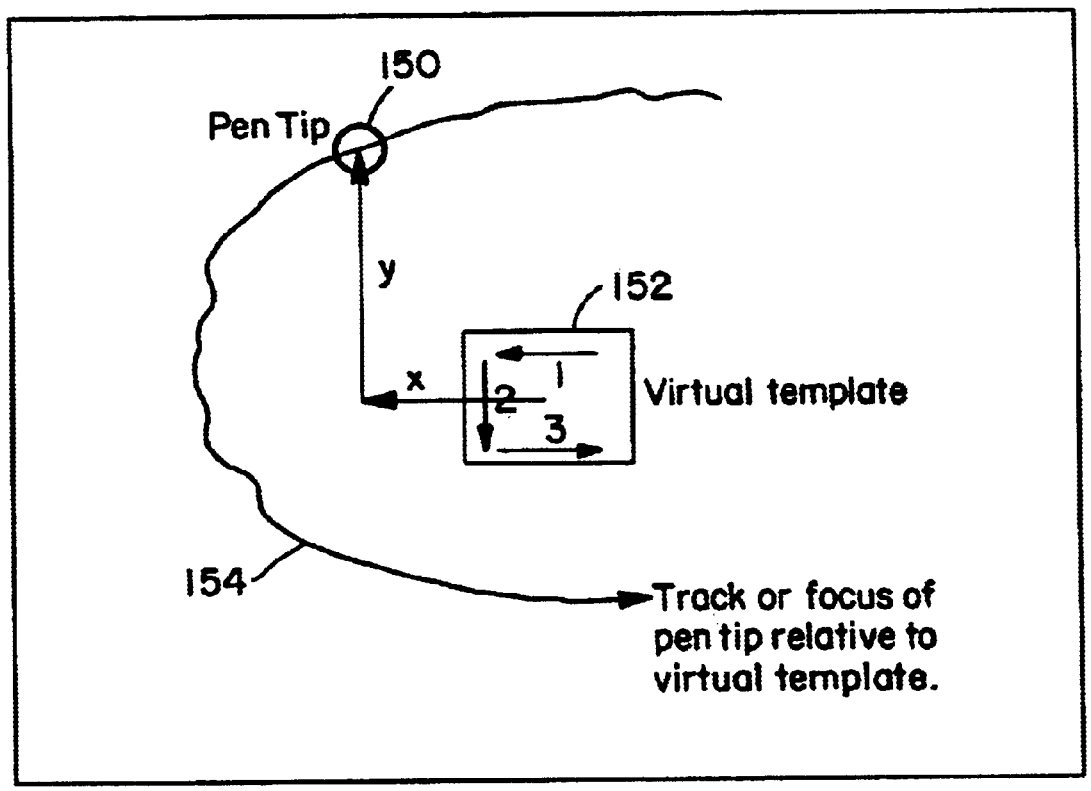
FIG. 15 illustrates the principle of using a virtual template in relation to a pen device according to the invention.

FIG. 15 of the drawings shows schematically a pen device operating with a virtual template. The position of the pen tip 150 relative to the centre of the virtual template 152 is sensed in terms of its x, y coordinates as shown. As the pen body is moved around the pen tip by the fingers, the notional template moves with the pen body and causes a relative movement between the pen tip and the template. The track or locus of the pen tip relative to the virtual template is indicated by line 154.

The movement is referred to template sides, ie is registered as a mapping of the pen tip position onto the template, resulting for example in the unit vector L D R, which could decode as the character "c".

Provided the pen tip travels around the outside of the template and the template is always smaller than the smallest character drawn, then the sequence of unit vectors will always decode for the stylised character shapes irrespective of the scale or speed they are drawn.

Figure 17:
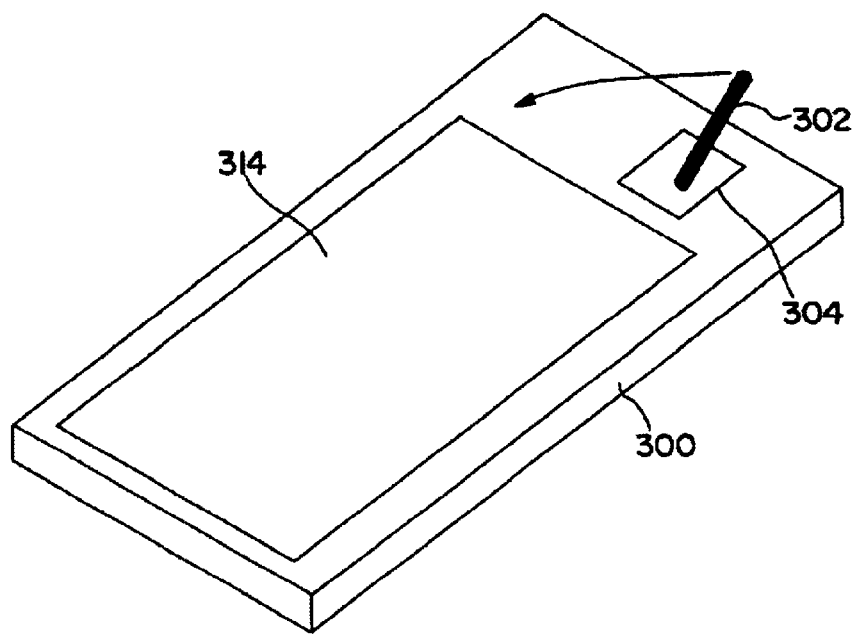
FIG. 17 shows a pocket databank with a pen device of the invention.

Another embodiment of the invention (see FIG. 17) consists of a template built in to a portable databank 300, or portable computer or other product requiring the input of information such as a video recorder, pocket calculator, telephone, central heating controller, washing machine etc etc. The template sensors are activated by the movement of a small stylus 302 held by the fingers.

Figure 16:
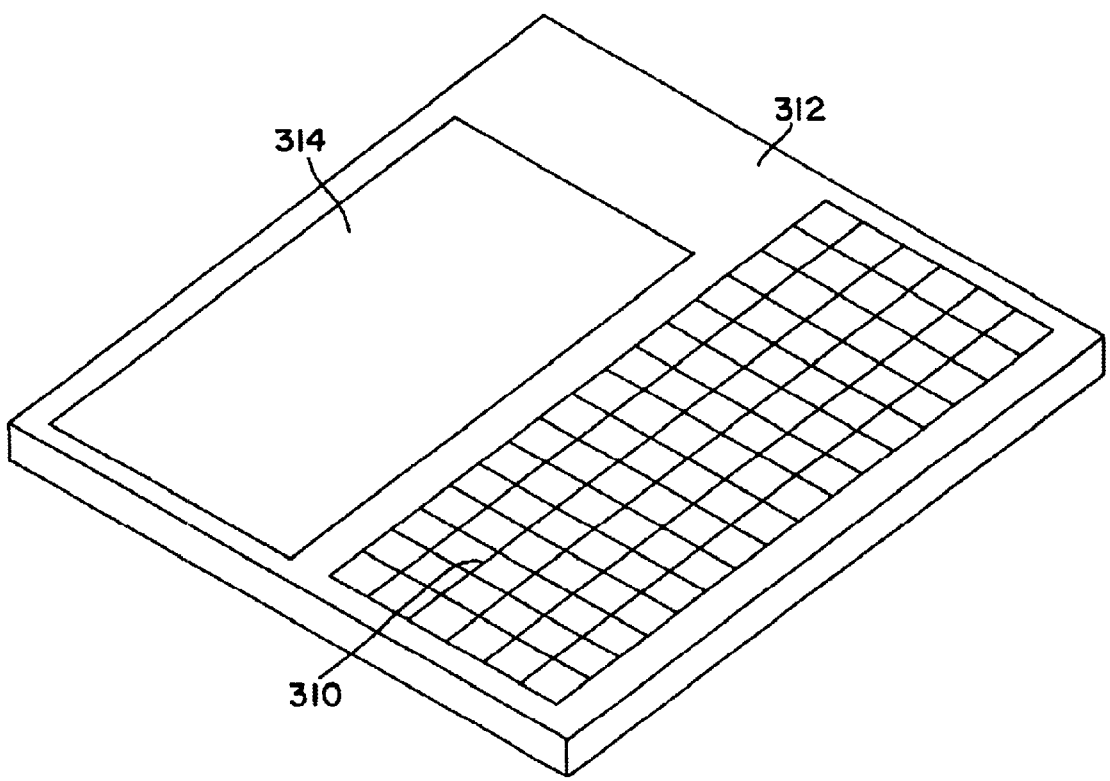
FIG. 16 shows a pocket databank with conventional keyboard.

The stylus may be attached or hinged to the product or may be removable or separate. This application will allow the space taken up by data input to greatly reduce as the stylus template 304 will replace the much larger keyboard or keypad 310 of a conventional pocket databank 312 (see FIG. 16) having a screen 314. The stylus may fold down as shown to conserve space when not in use. The advantages of this embodiment of the invention are that the product can be made considerably smaller, the stylus can be used with the eyes on the screen 314 and can be used more easily than the usually cramped keyboard keys, and data can be input more quickly. The input device can be fabricated at considerably less expense than a keyboard or touch sensitive screen. Also a data link cable between the pocket databank etc could connect with a computer to allow text input from the built-in pen device to be input to the computer.

What is claimed is:

1. Means for inputting a hand generated character into a digital device comprising means for drawing a character, means for detecting characteristics of movements in drawing a character to produce a code for the character as a time dependent sequence of signals, by comparing each characteristic as the character is drawn with a predetermined set of characteristics, each signal corresponding to the predetermined characteristic closest to the actual characteristic detected at each successive step of movement, and visual feedback means, wherein a component of a character is displayed with each successive signal in the sequence for the character being hand generated positionally independently of the drawing means.

2. Means as claimed in claim 1, wherein movement of the drawing means is abstracted as unit vectors.

3. Means as claimed in claim 1, wherein recognition occurs character by character in real time.

4. Means as claimed in claim 1 further comprising means for displaying the recognized character.

5. Means as claimed in claim 1 further comprising means for providing visual feedback corresponding to the character being inputted as each signal is abstracted.

6. Means as claimed in claim 5, wherein the visual feedback means comprises means for producing on a monitor a graphic simulation of a character component in response to an abstracted signal.

7. Means as claimed in claim 6, wherein said graphic simulation is modifiable in response to a subsequent signal of a sequence for a character.

8. Means as claimed in claim 6, wherein said graphic simulation further comprises an indicator as to position of the drawing means on a drawing surface.

9. Means as claimed in claim 8, wherein said indicator comprises an icon displayed at or near the end of the latest graphic simulation component.

10. Means as claimed in claim 8, wherein said indicator comprises an icon that moves around the graphic simulation of a character in response to movement of the drawing means.

11. Means as claimed in claim 6 further comprising means for displaying on the monitor the character as a reproduction thereof.

12. Means as claimed in claim 1 including means for signaling completion of a character.

13. Means as claimed in claim 12, wherein the drawing means is arranged to signal completion of a character by lifting the drawing means from a drawing surface.

14. Means as claimed in claim 13, wherein completion of a character is indicated by a unique movement of the drawing means relative to that character.

15. Means as claimed in claim 13, wherein completion of a character is indicated by movement of one of the drawing means and an icon indicative of the drawing means to a defined position.

16. Means as claimed in claim 15, wherein said defined position is an area of a drawing surface.

17. Means as claimed in claim 15, wherein said defined position is an area defined on a monitor.

18. Means as claimed in claim 1, wherein the drawing means comprises a hand-held pen-like device.

19. Means as claimed in claim 18, wherein the device has a part, which is movable about a template during reproduction of a character.

20. Means as claimed in claim 19, wherein the part is movable relative to a notional template.

21. Means as claimed in claim 19, wherein the drawing means comprises a hollow body part movable about a real or notional template within the hollow body part.

22. Means as claimed in claim 19, wherein at least one movable apart of the device and the remainder of the device and/or template are flexibly linked.

23. Means as claimed in claim 22, wherein at least one movable part of the device is a tip movable relative to a body of the device and one or more flexible linkages affect movement of the tip relative to the body.

24. Means as claimed in claim 23, wherein the sensing means are selected from electrical, photoelectric and magnetic sensing means.

25. Means as claimed in claims 19 including means for sensing direction of movement of said device or part thereof relative to a real or notional template in reproducing a character.

26. Means as claimed in claim 24, wherein sensing means are spaced about said real or notional template.

27. Means as claimed in claim 19, wherein the template is a generally square enclosure.

28. Means as claimed in claim 19, wherein the template is a generally circular enclosure.

29. Means as claimed in claim 19, wherein the template defines a track.

30. Means as claimed in claim 19, wherein the template has a plurality of zones and said part moves from zone to zone in reproducing a character.

31. Means as claimed in claim 1 including means for converting a signal for a lower case character into a signal for an upper case character.

32. Means for inputting a hand generated character into a digital device as claimed in claim 1, wherein the characteristics of the movements in drawing a character are directions of movement.

33. Means as claimed in claim 32, wherein abstraction of a direction change is speed independent.

34. Means as claimed in claim 32, wherein abstraction of a direction change is scale independent.

35. Means as claimed in claim 32, wherein abstraction of a direction change is substantially independent of distortions or variations in the character as drawn.

36. Means for inputting a hand generated character into a digital device as claimed in claim 1, wherein the characteristics of the movements in drawing a character are successive positions.

37. Means for inputting a hand generated character into a digital device as claimed in claim 1, wherein the characteristics of the moverments in drawing a character are successive changes in velocity or higher time derivative of motion.

38. Means for inputting a hand generated character into a digital device as claimed in claim 1, wherein the characteristics of the movements in drawing a character are successive components of shape.

39. Means for inputting a hand generated character into a digital device as claimed in claim 1, wherein the visual feedback comprises display of a character built up and, optionally, modified step by step in correlation with the time dependent sequence of signals produced as the hand generated character is drawn.

40. Means for inputting a hand generated character into a digital device as claimed in claim 1, wherein the visual feedback comprises automatic displaying of a character in a selected font being built up and, optionally, modified step by step, each step corresponding to one of the signals of the code sequence for the character being drawn and in the same order as the code sequence.

41. Means for inputting a hand generated character into a digital device as claimed in claim 1, wherein the visual feedback comprises display of a character built up and, optionally, modified step by step in correlation with the time dependent sequence of signals produced as the hand generated character is drawn, and in that each step of the display is dependent on the preceding signal or signal sequence of the character being drawn.

\* \* \* \* \*